(12) United States Patent
Ofuji et al.

(10) Patent No.: US 7,559,163 B2
(45) Date of Patent: Jul. 14, 2009

(54) DISPLAY DEVICE

(75) Inventors: Masaaki Ofuji, Osaka (JP); Naoya Taki, Osaka (JP)

(73) Assignee: Panasonic Corporation, Osaka (JP)

(*) Notice: Subject to any disclaimer, the term of this patent is extended or adjusted under 35 U.S.C. 154(b) by 230 days.

(21) Appl. No.: 10/591,104

(22) PCT Filed: Feb. 23, 2005

(86) PCT No.: PCT/JP2005/002867

§ 371 (c)(1), (2), (4) Date: Aug. 30, 2006

(87) PCT Pub. No.: WO2005/083658

PCT Pub. Date: Sep. 9, 2005

(65) Prior Publication Data

US 2007/0180745 A1    Aug. 9, 2007

(30) Foreign Application Priority Data

Mar. 1, 2004    (JP)  ............................. 2004-055954

(51) Int. Cl.
*G09F 11/18* (2006.01)
(52) U.S. Cl. .......................... 40/514; 40/603; 40/601; 40/600; 40/606.12; 40/517; 160/265
(58) Field of Classification Search ................. 40/514, 40/517, 518, 601, 603, 483, 519, 520; 348/820; 359/461; 160/368.1, 352, 370.22, 69, 265, 160/24
See application file for complete search history.

(56) References Cited

U.S. PATENT DOCUMENTS 314,405 A * 3/1885 Whipple ...................... 40/518
1,669,052 A * 5/1928 Gusman et al. ............... 40/514
4,817,318 A * 4/1989 Strauch ....................... 40/610

(Continued)

FOREIGN PATENT DOCUMENTS

JP    07-028395    1/1995

(Continued)

OTHER PUBLICATIONS

International Search Report corresponding to International PCT Application No. PCT/JP2005/002867 dated May 31, 2005.

*Primary Examiner*—Joanne Silbermann
*Assistant Examiner*—Christopher E Veraa
(74) *Attorney, Agent, or Firm*—RatnerPrestia

(57) ABSTRACT

A display device includes a display part made of a roll-up sheet-like direct-view display element; a take-up part attached on one end of the display part, the take-up part allowing the display part to be rolled up; a pulling part attached on the other end of the display part, the pulling part allowing the display part to be roll out; and a holding part for holding the display part from behind. The holding part is formed of linkage, which can be stored on the rear surface of the display part when the display part is rolled up, and can be stretched across the rear surface of the display part when the display part is rolled out. This enables the holding part to be stretched across the rear surface of the display part when the display part is spread out so as to prevent the display part from swaying, thereby maintaining excellent display.

12 Claims, 15 Drawing Sheets

U.S. PATENT DOCUMENTS

| | | | |
|---|---|---|---|
| 6,249,377 B1 * | 6/2001 | Takamoto et al. | 359/461 |
| 6,466,369 B1 * | 10/2002 | Maddock | 359/460 |
| 6,557,280 B2 * | 5/2003 | Seidel | 40/455 |
| 6,853,486 B2 * | 2/2005 | Cruz-Uribe et al. | 359/443 |
| 2001/0010133 A1 * | 8/2001 | Schoening | 40/518 |
| 2005/0185273 A1 * | 8/2005 | Lee | 359/461 |
| 2006/0209406 A1 * | 9/2006 | Choi | 359/461 |
| 2007/0211036 A1 * | 9/2007 | Perkins | 345/173 |

FOREIGN PATENT DOCUMENTS

| | | |
|---|---|---|
| JP | 9-216465 | 8/1997 |
| JP | 2001-100661 | 4/2001 |
| JP | 2002-162652 | 6/2002 |
| JP | 2002-182582 | 6/2002 |
| JP | 2002-328625 | 11/2002 |
| JP | 2003-250074 | 9/2003 |
| JP | 2003-274250 | 9/2003 |

\* cited by examiner

DISPLAY DEVICE

This application is a U.S. National Phase Application of PCT International Application No. PCT/JP2005/002867, filed Feb. 23, 2005.

TECHNICAL FIELD

The present invention relates to a display device, and more particularly, to a display device having a display part that can be rolled up and is sheet-like in form.

BACKGROUND ART

In recent years, there is a rapidly increasing demand for large flat screen displays. To meet this demand, there have been efforts to increase the screen size of plasma displays, liquid crystal displays and organic EL displays.

It is not practical, however, to install displays above a certain size in houses, assembly halls, conference rooms and the like because this hinders the use of these spaces for other purposes.

For this reason, in order to watch DVDs or Blue-ray Discs on a large screen above a certain size or to output data from PC screens, projection display devices such as projectors are often used. Projectors are compact enough to be portable and have a screen that can be rolled up and stored compactly.

Projectors, however, have a disadvantage that it is difficult to display bright images on the screen. As another disadvantage, it is troublesome to focus the lens every time they are set up.

To overcome these disadvantages, there have been suggestions to make large flat-screen direct-view display devices having a liquid crystal display or an organic EL display flexible enough to be rolled up. For example, Japanese Patent Unexamined Publication No. H07-28395 discloses a device which accommodates a bendable liquid crystal display in a display housing. Japanese Patent Unexamined Publication No. 2002-328625 discloses a display device which includes a screen-like display part that can be rolled up for storage.

An organic EL element used in an organic EL display has the following preferable features: self-luminousness, excellent visibility, rapid response, lightweightness, slimness, and the ability to be driven at a low voltage of several volts or less. Display devices using such an organic EL element have a flexible structure because a display function layer and a layer including an electric function part for working the display function layer are both made thin.

In general, an organic EL display includes as separate devices peripheral circuits such as a power supply, a drive device and a control device, and an acoustic device such as a speaker. For example, in Japanese Patent Unexamined Publication No. 2002-162652, the display device and these devices are connected to each other using an electric wire, a flexible circuit board, or the like.

However, when a display device using a self-luminous element such as an organic EL display with a large screen above a certain size like 100 in or more is designed to be rolled up, the high flexibility causes the following problems when the screen is set up.

For one thing, when a sheet-like large image display device using an organic EL is set up, the image display part is swayed by the wind from an air conditioner or shaken by vibration from the acoustic device such as a speaker, making it harder to provide clear images.

For another thing, it is difficult to property set up the display device itself. For example, when a sheet-like image display device is placed in the horizontal direction, the sheet-like display part tends to sag in the center.

Such swaying and sagging should be absolutely eliminated in a large-screen display device using a self-luminous element such as an organic EL display that can be rolled up for storage because of the following reason.

In the case of a projector, swaying or sagging of the screen never alters the position of the projector main body and only causes images to be displayed in an enlarged or reduced size according to the swaying. This allows the audience to continue to see images unless the screen is inclined too much.

In contrast, in the case of a large-screen direct-view display device including a self-luminous element such as an organic EL display, the images on the display part are generated by the display part itself, unlike the projector. Therefore, if the display part sways, the images and texts shown on the display part can be greatly changed in position. This means that the swaying of the screen directly leads to difficulty in displaying clear images. Furthermore, images on the area of the screen that is sagged in accordance with the direction to place the display device are displayed in a curved shape.

For yet another thing, in a large-screen display device using a self-luminous element such as an organic EL display, images to be displayed on the display part are generated by the own mechanism of the display part. This may be highly likely to cause trouble when the display part sways and hits a wall or a stationary object around it, or sags and bends to damage pixels while being set up.

In the case of the projector, external devices are connected to the projector main body, and the screen just displays images projected from the projector main body. Therefore, the swaying of the screen never triggers trouble in the projector main body or the external devices. In contrast, the large-screen display device using a self-luminous element such as an organic EL display is directly connected with the external devices using a distribution cable. Therefore, the swaying of the display device may cause the distribution cable connected with the external devices to be yanked, thereby pulling the wiring out or causing the external devices yanked along with the distribution cable to fall off the shelf.

This is why large-screen display devices using a self-luminous element that can be rolled up for storage require countermeasures against swaying and sagging. The countermeasures should be something that does not hinder the function of the display part, which is, to be rolled up for storage.

For example, Japanese Patent Unexamined Publication No. H07-28395 suggests a display device which has display fixing frames for fixing both ends of a bendable liquid crystal display. However, in a lightweight and flexible sheet-like image display device using a self-luminous element such as an organic EL element, the aforementioned problem cannot be fully solved only by the mechanism of stretching the display fixing frames to the display ends. More specifically, the mere provision of the display fixing frames on the ends of the display cannot sufficiently reduce vibration or sagging at the center of the display part that is not supported by the display fixing frames.

SUMMARY OF THE INVENTION

In order to solve the aforementioned problem, the display device of the present invention includes: a roll-up sheet-like display part for displaying images using a direct-view display element such as a self-luminous element; a take-up part attached on one end of the display part, the take-up part allowing the display part to be rolled up; a pulling part attached on the other end of the display part, the pulling part allowing the display part to be roll out; and a holding part for holding the display part from behind. The holding part is formed of linkage, which is stored on the rear surface of the display part when the display part is rolled up, and is stretched across the rear surface of the display part when the display part is rolled out.

This structure enables the holding part to be stretched across the rear surface of the display part when the display part is spread out, thereby reducing the swaying, sagging, or wrinkling of the display part.

Another preferred structure of the present invention is that the linkage consist of two rails crossing in the shape of an X, and the take-up part and the pulling part each comprise a first rail support for supporting one end of one of the rails rotatably; and a second rail support for supporting the other end of the rail rotatably and slidably.

In this case, the first and second rail supports allow the holding part to be fixed at two points by the take-up part and the pulling part, thereby reducing the swaying of the holding part itself. This structure can reduce swaying and sagging particularly in the center and four corners of the display part which is spread out before the holding part.

Another preferred structure of the present invention is that the linkage consists of a plurality of pairs of rails, each pair having two rails crossing in the shape of an X, and the rails of a rail pair are rotatably connected to the rails of another rail pair at ends thereof. The take-up part and the pulling part each include: a first rail support for supporting one end of one of the rails rotatably; and a second rail support for supporting the other end of the rails rotatably and slidably.

This structure can increase the number of rails of the holding part stretching across the rear surface of the display part, and reduce the area of the display part to be supported by each rail. As a result, the holding part can be resistant to strong wind so as to effectively reduce the swaying of the display part.

Another preferred structure of the present invention is that the take-up part and the pulling part each include an elastic member, which biases the second rail support in the direction of an end of the take-up part or the pulling part.

This can facilitate the rolling up of the display part for storage by making use of the biasing force of the elastic member.

Another preferred structure of the present invention is that a first joint part provided on the rear surface of the display part and a second joint part provided on the holding part in such a manner as to correspond to the first joint part in position are coupled when the display part is spread out.

This structure allows the display part and the holding part to be fixed so as to prevent the display part from being swayed by the wind from behind or a lateral side or by the vibration of a speaker or the like. Furthermore, when it is laid sideways, the display part is supported by the holding part so as not to be sagged. In this case, the joint parts can be made of a sheet-like material (for example, a sheet-like magnet) to keep the size of the display part small after being rolled up.

Another preferred structure of the present invention is that at least one of the take-up part and the pulling part is provided at a side end thereof with a bending part which is bent backward.

The bending part can prevent the swaying of the display part particularly on its lateral sides. This can prevent sagging or wrinkling particularly when the display part is laid sideways.

Another preferred structure of the present invention is that the take-up part includes: a power circuit for supplying power to the display part and an audiovisual circuit for supplying an audiovisual signal to the display part; the holding part includes a power wiring for supplying the power to the power circuit and an audiovisual wiring for supplying the audiovisual signal to the audiovisual circuit; and that the power wiring and the audiovisual wiring are connected to an external power supply and an audiovisual device via a connecting part provided in the pulling part.

Roll-up display devices often do not have enough space to accommodate the power wiring and the audiovisual wiring. In contrast, the structure of the present invention has enough space to store them.

In a case where magnetic force is used for the joint parts, when the holding part is provided with wirings, it is preferable to provide a shield on the rear surface of the display part to avoid magnetic or electromagnetic influence.

This can prevent images on the display part from being distorted by the influence of magnetism or electromagnetism.

Thus the present invention can reduce the swaying of the display part caused by wind and other factors, while maintaining the desirable feature i.e. compact storage of the roll-up sheet-like display device using a self-luminous element such as an organic EL element. The invention can also prevent the display part from being sagged, thereby facilitating the setting up of the display device.

Figure 1:
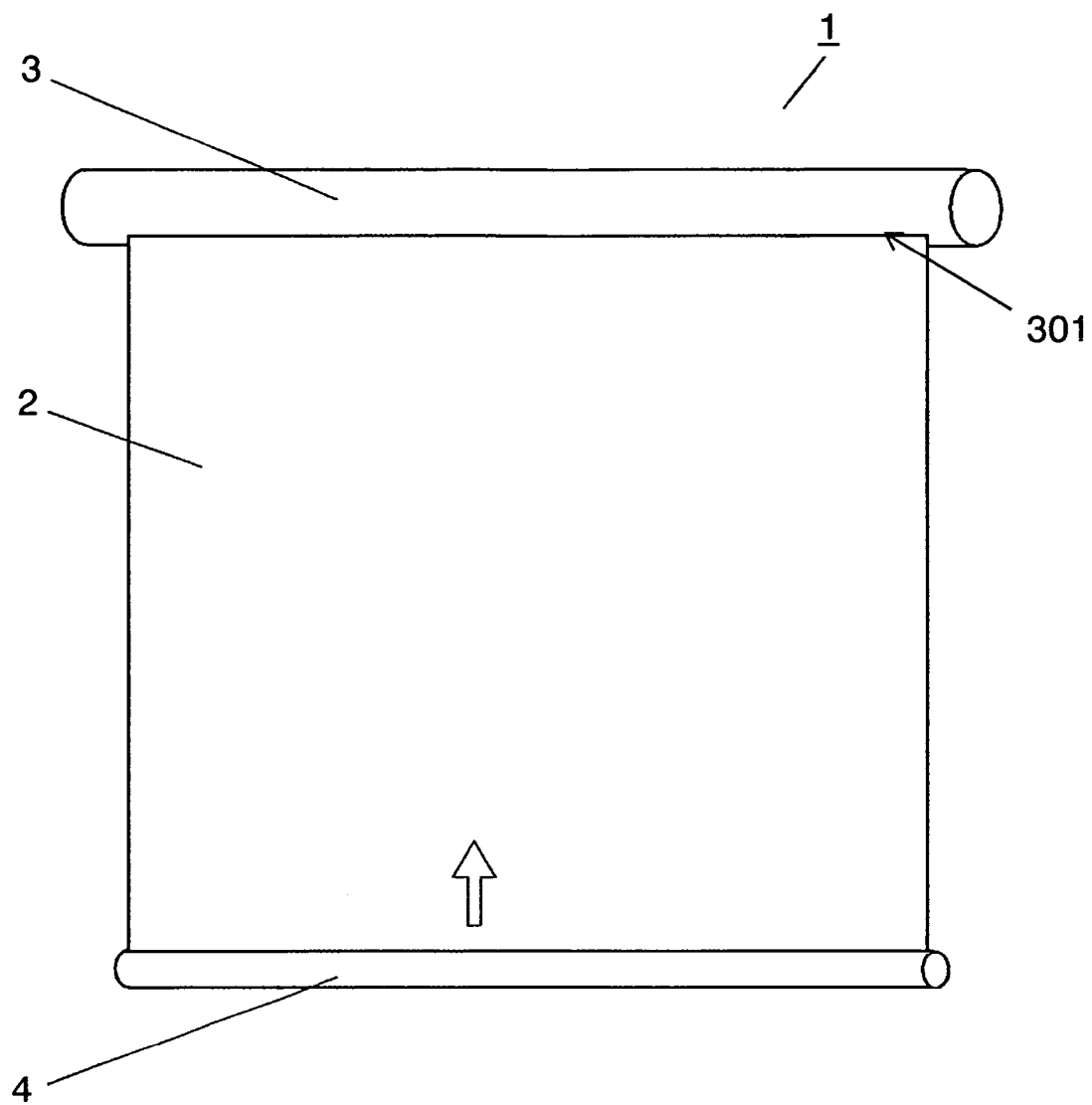
FIG. 1 is a view showing a structure of a display device of a first embodiment of the present invention.

REFERENCE MARKS IN THE DRAWINGS 1 display device
2 display part
3 take-up part
4 pulling part
10 display device
11 first rail
12 second rail
13 rail intersection
14 first rail support
15 second rail support
16 spring
17 stopper
18 switch
19 stopper
20 fixing rail
21 rotating part
22 locking member
23 locking member
30 display device
31 first magnet
32 second magnet
40 display device
41 bending part
50 display device
51 hook
52 locking piece
60 display device
61 speaker
62 vibration-proof rubber (vibration-proof parts)
70 display device
71 audiovisual circuit
72 power circuit
73 audiovisual wiring
74 power wiring
75 audiovisual information reproducing means
76 AV amplifier
77 AC outlet
80 display device
81 image control device
82 array element
83 side detection part
84 direction controller
85 image display control part
86 tuner
87 side input part

DETAILED DESCRIPTION OF THE PREFERRED EMBODIMENTS

Embodiments of the present invention will be described as follows with accompanying drawings.

First Exemplary Embodiment

Figure 2:
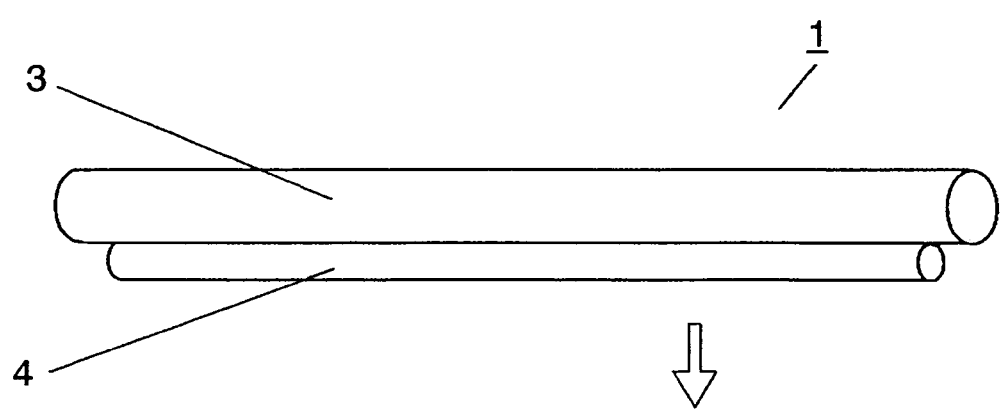
FIG. 2 is a view showing the structure of the display device of the first embodiment of the present invention.

FIGS. 1 and 2 are views showing a structure of display device 1 of a first embodiment of the present invention. FIG. 1 shows a state in which roll-up sheet-like display part 2 using an organic EL element is rolled out from cylindrical take-up part 3. FIG. 2 shows a state in which display part 2 is rolled up for storage in take-up part 3.

When display part 2 is housed in take-up part 3 (FIG. 2), the user of display device 1 can pull bar-shaped pulling part 4 attached at the bottom of display part 2 downward (in the arrow direction) to spread display part 2 out as shown in FIG. 1. On the contrary, when display part 2 is in a spread state (FIG. 1), the user can push pulling part 4 upward (in the arrow direction) to roll up display part 2 inside take-up part 3 as shown in FIG. 2.

Thus housing display part 2 completely in take-up part 3 allows a large-screen image display device to be stored compactly and to be ultraportable. It also prevents display part 2, which is not exposed, from getting dirty or being discolored.

Take-up part 3 in the first embodiment rolls up display part 2 inside for storage. However, take-up part 3 may be structured in any other way as long as it rolls up display part 2 around its axis. For example, display part 2 may be rolled up by being biased in the roll-up direction using an elastic member such as a spring or a rubber, and be spread out by fixing pulling part 4 to an external fixing part with a hook. Taking the hook off of the external fixing part can roll up display part 2 automatically inside take-up part 3. Alternatively, take-up part 3 can be designed to roll up display part 2 around its outer surface.

In the case of rolling up display part 2 inside take-up part 3 for storage, take-up port 301 of take-up part 3 may be provided with dust brush. The dust brush can clean the surface of display part 2 every time display part 2 is rolled up inside or rolled out from take-up part 3, thereby keeping the surface clean. Take-up port 301 of take-up part 3 may also be provided with a rubber lid having a slit in the center. In this case, display part 2 is pulled through the slit of the rubber lid on the take-up port of take-up part 3. The rubber lid protects take-up part 3 from the entry of dust when display part 2 is rolled up for storage. Note that the material of the dust brush on take-up part 3 is not particularly limited. For example, a dust brush made of a conductive material can attract dust deposited on the surface of display part 2 by static electricity caused by the contact friction between the brush and display part 2 when display part 2 is rolled up inside or rolled out from take-up part 3. Alternatively, an earthed conductive brush can remove static electricity so as to make the dust removal effective. It is also possible to replace the rubber lid on take-up part 3 by a lid made of another material.

Take-up part 3 is cylindrical and pulling part 4 is bar-shaped in the first embodiment; however, they can have other shapes as long as they fulfill their functions. For example, take-up part 3 may be a rectangular column, or pulling part 4 may be formed only at the bottom center of display part 2.

Another preferred structure is that pulling part 4 is rolled up, together with display part 2, inside take-up part 3 for storage. This structure allows the display device to be stored more compactly.

Display device 1 in the first embodiment is an organic EL display using an organic EL element as display part 2, but is not limited to an organic EL display. More specifically, display device 1 can be any type as long as it is a direct-view display device such as an inorganic EL display or a liquid crystal display device which has a sheet-like light-emitting element as a backlight on the rear surface, and which is sheet-like and can be rolled up.

Second Exemplary Embodiment

Figure 3:
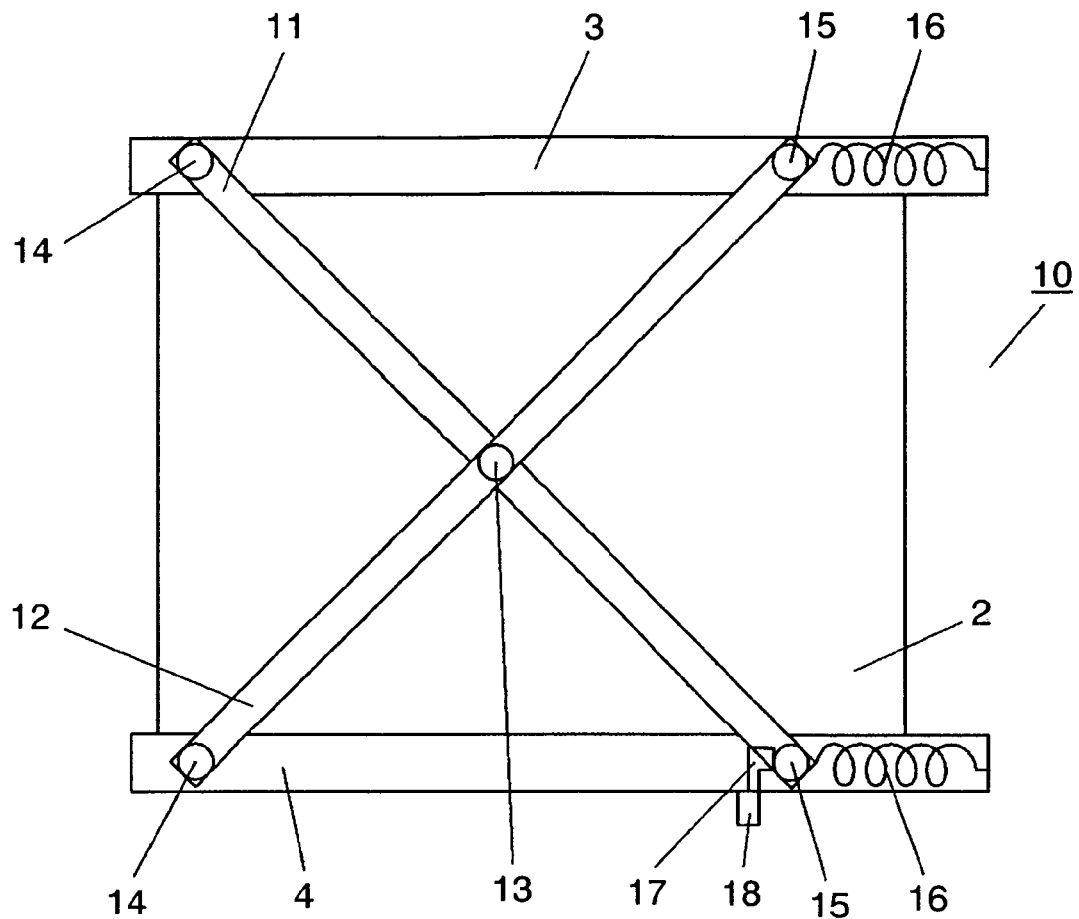
FIG. 3 is a rear view showing a structure of a display device of a second embodiment of the present invention.
Figure 4:
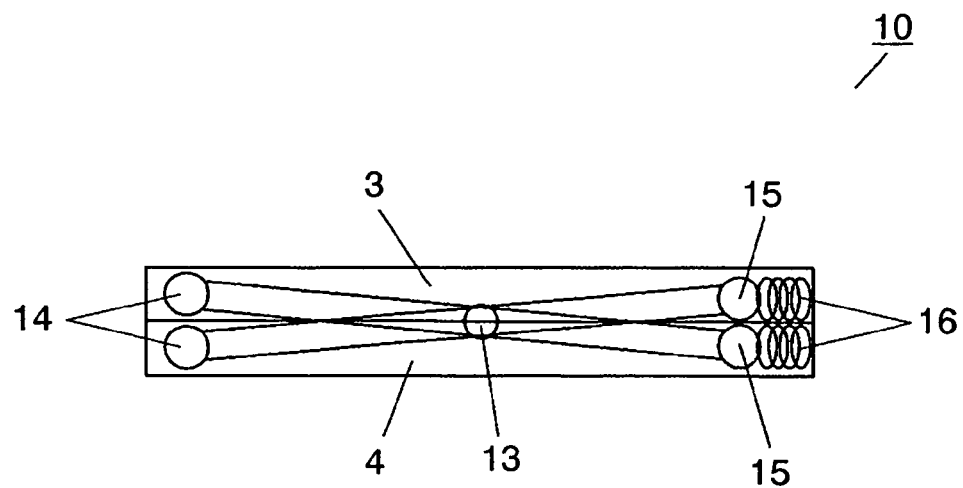
FIG. 4 is a rear view showing the structure of the display device of the second embodiment of the present invention.

FIGS. 3 and 4 are rear views showing a structure of display device 10 of a second embodiment of the present invention. FIG. 3 shows a case in which roll-up sheet-like display part 2 using an organic EL element in display device 10 is spread out. FIG. 4 shows a case in which display part 2 is rolled up for storage in cylindrical take-up part 3.

In FIG. 3, display part 2 is provided on its rear surface with a set of linkage consisting of first rail 11 and second rail 12, which is rotatably supported at rail intersection 13. Take-up part 3 and cylindrical pulling part 4 have a pair of first rail supports 14 supporting one end of first and second rails 11 and 12 rotatably, and a pair of second rail supports 15 supporting the other end of first and second rails 11 and 12 rotatably and slidably. Second rail supports 15 are biased toward one end of take-up part 3 and pulling part 4 by springs 16 provided on the one end of take-up part 3 and pulling part 4. Springs 16 are extended against the biasing force when second rail supports 15 are slid toward first rail supports 14, that is, when display part 2 is rolled out from take-up part 3.

At this moment, the user can engage stopper 17 with switch 18 to fix second rail supports 15, thereby keeping display part 2 in a spread state. On the other hand, in order to take display device 10 away, the user can operate switch 18 to disengage stopper 17. As a result, the restoring force of the springs causes second rail supports 15 to slide toward one end of take-up part 3 and pulling part 4. This allows the pair of linkage consisting of first and second rails 11 and 12 to be folded in such a manner as to be stretched in right and left directions from rail intersection 13, thereby rolling up display part 2 inside take-up part 3 for storage.

Take-up part 3 and pulling part 4 are hollow cylinders so that display part 2 and the linkage consisting of first and second rails 11 and 12 can be stored therein. As shown in FIG. 4 when display part 2 is rolled up for storage, display part 2 and the linkage consisting of first and second rails 11 and 12 is completely housed inside take-up part 3 and pulling part 4. Thus, display part 2 and the linkage consisting of first and second rails 11 and 12 is stored unexposed.

Thus housing display part 2 completely in take-up part 3 allows a large-screen image display device to be stored compactly and to be ultraportable. It also prevents display part 2, which is not exposed, from getting dirty or being discolored.

When sheet-like display part 2 is rolled out from take-up part 3, the linkage consisting of first and second rails 11 and 12 is stretched across the rear surface of the display part. This structure reduces the swaying of display part 2 caused by the wind from an air conditioner or natural wind or by the vibration of the acoustic device such as a speaker. The structure is particularly resistant to the wind coming from the front of display part 2. As a result, the user can easily set up display device 1 without regard to wind. When the display device is set up, take-up part 3 is usually fixed on a ceiling or the like, so take-up part 3 itself is never swayed by the wind or other causes. In the present invention, take-up part 3 fixed in this manner is connected with pulling part 4 and the linkage, making it possible to reduce the swaying of not only the display part, but the whole display device. Therefore, it can be prevented that the display device of the present invention is damaged by bumping into an external object, or that an external device connected to the display device via a distribution cable falls due to the swaying of the display device.

Springs 16, stopper 17, and switch 18 used in the second embodiment are not essential components of the present invention, and the advantages of the present invention could be obtained without them.

Figure 5:
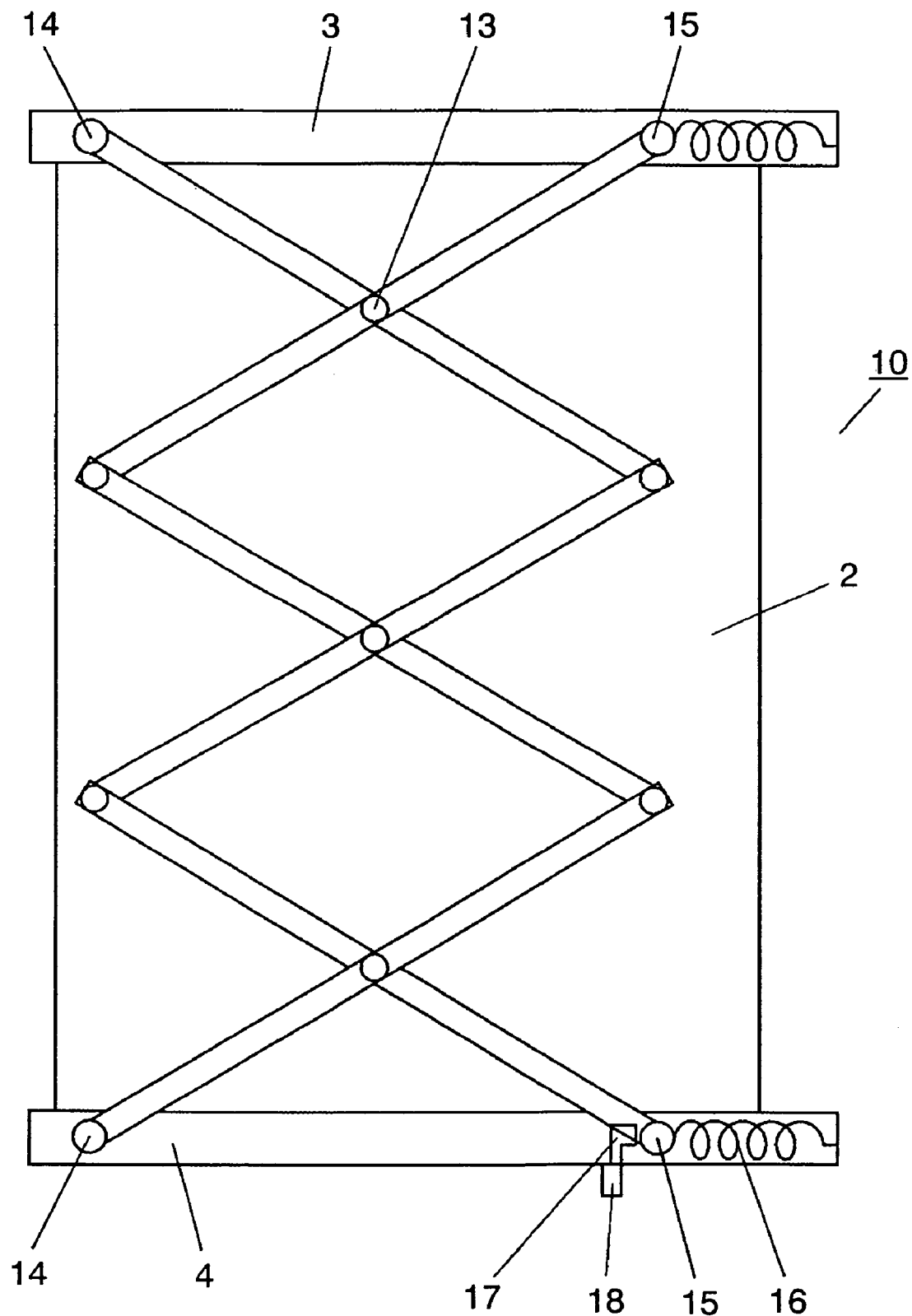
FIG. 5 is a rear view showing another structure of the display device of the second embodiment of the present invention.

Instead of the set of linkage consisting of first and second rails 11 and 12 provided on the rear surface of display part 2 in the second embodiment, linkage consisting of two or more pairs of rails may be provided as shown in FIG. 5. In this case, more rails are stretched across the rear surface of display part 2, thereby enhancing the effect of preventing display part 2 from being swayed or shaken by the wind.

Figure 6:
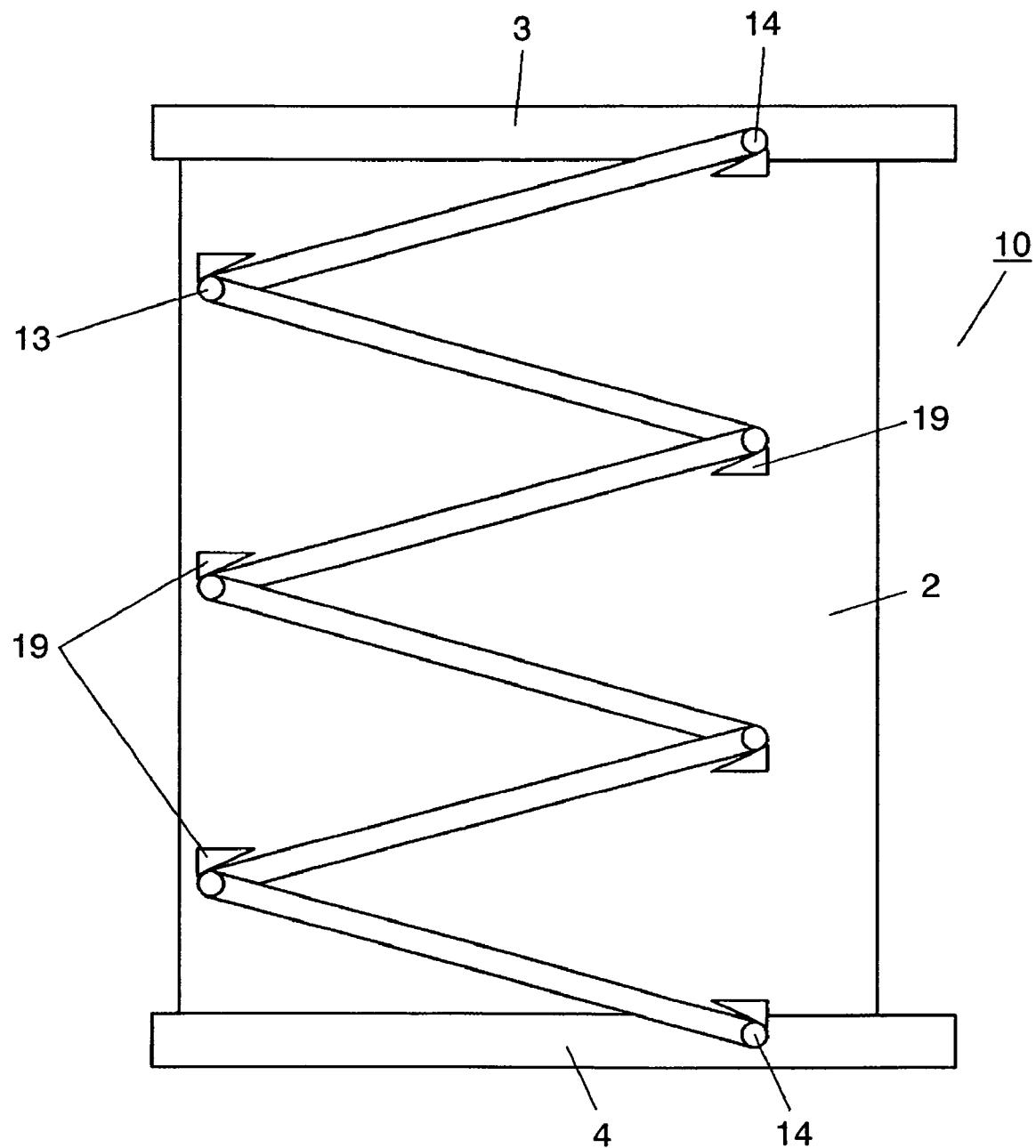
FIG. 6 is a rear view showing another structure of the display device of the second embodiment of the present invention.

Another preferred structure is shown in FIG. 6 where one end of first rail 11 and one end of second rail 12 of the linkage are rotatably supported by first rail supports 14 on take-up part 3 and pulling part 4, respectively, and first rails 11 and second rails 12 are connected to each other at their ends in such a manner as to be rotatably supported by rail intersections 13. In this case, first rails 11 and second rails 12 are prevented from being stretched at too large an angle by providing stoppers 19 on take-up part 3, pulling part 4, first rails 11, and second rails 12. The linkage consists of six rails in FIG. 6; however, the number of the rails is not particularly limited and may be any plural number. Having a larger number of rails stretched across the rear surface of display part 2 can enhance the effect of preventing display part 2 from being swayed or shaken by the wind or other causes. Stoppers 19 in this example may have any structure and be provided in the inner axis of rail intersections 13. Although display device 10 shown in FIG. 6 includes three first rails 11 and three second rails 12, the present invention does not limit the number of the rails to these.

Figure 7:
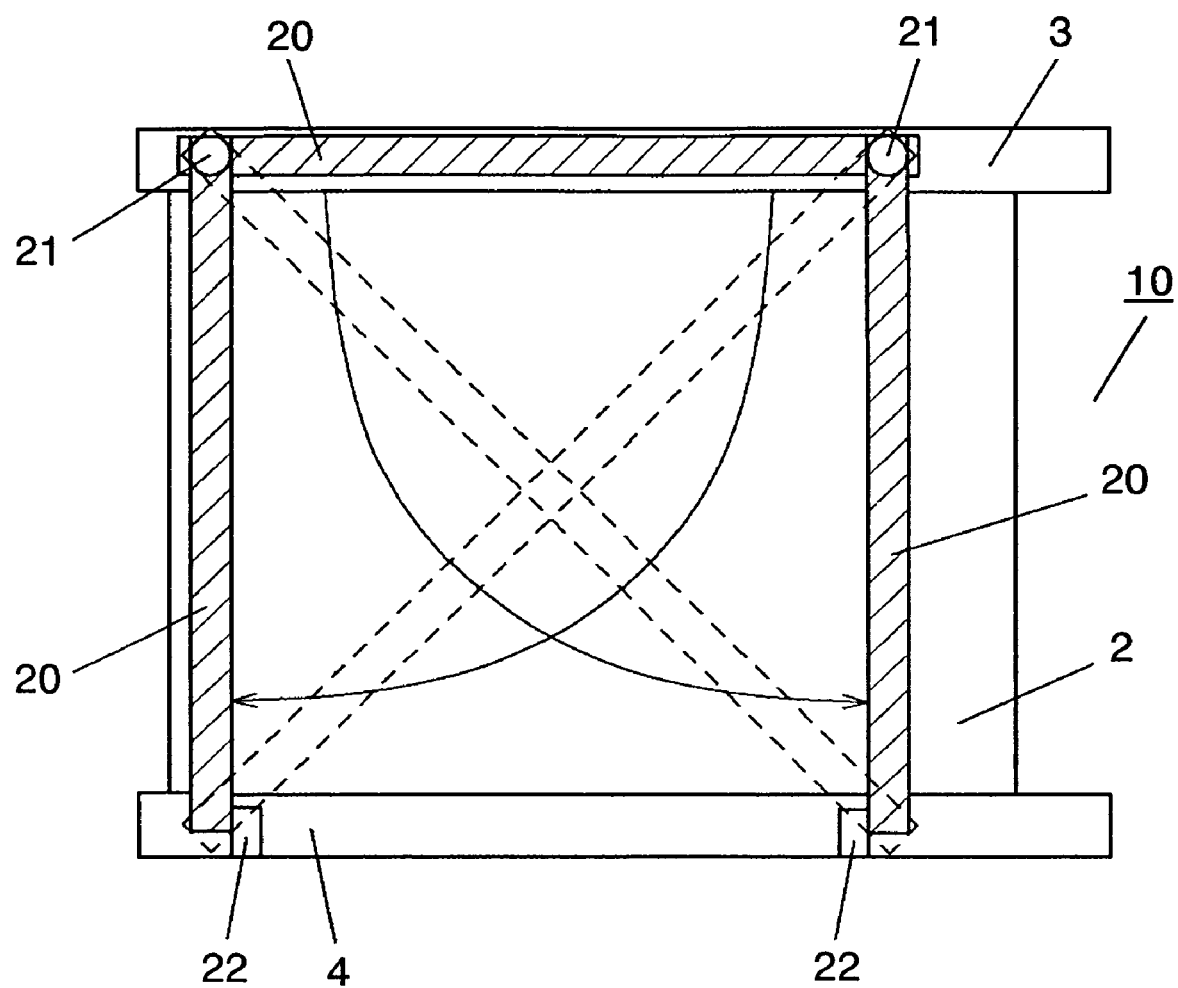
FIG. 7 is a rear view showing another structure of the display device of the second embodiment of the present invention.

Another preferred structure is shown in FIG. 7 where display part 2 is provided on its rear surface with fixing rails 20 to fix its both ends when it is spread out. Fixing rails 20 are housed in take-up part 3 when display part 2 is in a rolled-up state, and stretched out to both ends of display part 2 by being rotated about rotating parts 21 when display part 2 is spread out. When stretched, fixing rails 20 are fixed at their ends to take-up part 3 or pulling part 4 by locking members 22 provided on pulling part 4. This allows the rear surface of display part 2 to be supported by these fixing rails in addition to the linkage, thereby enhancing the effect of preventing display part 2 from being swayed or shaken by the wind or other causes. Fixing rails 20 may be provided either on pulling part 4 or on both take-up part 3 and pulling part 4. When fixing rails 20 are provided on pulling part 4, locking members 22 may be provided on take-up part 3. It is alternatively possible to provide only one fixing rail 20.

Figure 8:
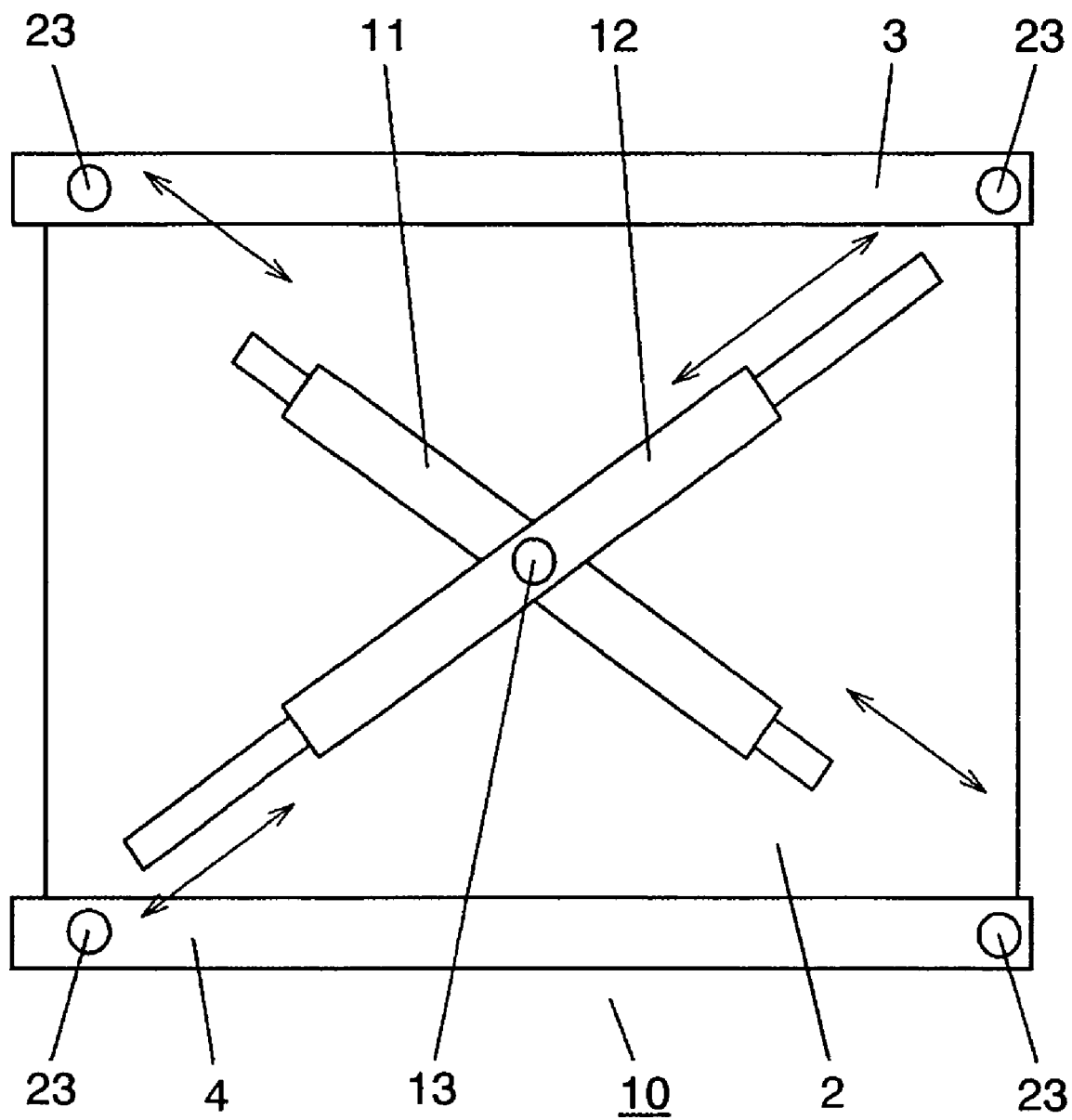
FIG. 8 is a rear view showing another structure of the display device of the second embodiment of the present invention.

Another preferred structure is shown in FIG. 8 where a set of linkage stretched across the rear surface of display part 2 consists of first rail 11 and second rail 12 that can be extended as the display part is being spread. First and second rails 11 and 12, which are designed to be extendable, are extended in accordance with the spread of display part 2 until both ends of each rail reach locking members 23 provided on take-up part 3 and pulling part 4 and are engaged therewith. As a result, first and second rails 11 and 12 can support a lager area of the rear surface of display part 2, thereby enhancing the effect of preventing display part 2 from being swayed or shaken by the wind or other causes. First and second rails 11 and 12 shown in FIG. 8 are designed to be extended in two steps; however, they may be designed to be extended in three or more steps, or continuously.

The linkage provided on the rear surface of display part 2 may be designed to be detachable from take-up part 3 and pulling part 4 via first and second rail supports 14 and 15. In this case, the linkage can be detached from take-up part 3 and pulling part 4 and then folded for storage separately from display part 2, thereby achieving compact storage and portability.

Take-up part 3 in the second embodiment rolls up display part 2 inside for storage. However, as in the first embodiment, take-up part 3 may be structured in any other way as long as it rolls up display part 2 around its axis.

Take-up part 3 and pulling part 4 are cylindrical in the second embodiment; however, they can have other shapes as long as they fulfill their functions. For example, take-up part 3 may be a rectangular column, or pulling part 4 may be formed only at the bottom center of display part 2.

Another preferred structure is that pulling part 4 is rolled up, together with display part 2, inside take-up part 3 for storage. This structure allows the display device to be stored more compactly.

In the case of rolling up display part 2 inside take-up part 3 for storage, the take-up port of take-up part 3 may be provided with dust brush or with a rubber lid having a slit in the center as in the first embodiment.

Switch 18 may be fixed at an arbitrary position on take-up part 3 or pulling part 4. This allows the user to arbitrarily determine the position to fix second rail support 15, thereby controlling how much display part 2 is spread depending on the location where display device 10 is used.

Display device 1 in the second embodiment is an organic EL display using an organic EL element as display part 2, but is not limited to an organic EL display as in the first embodiment.

Third Exemplary Embodiment

Figure 9:
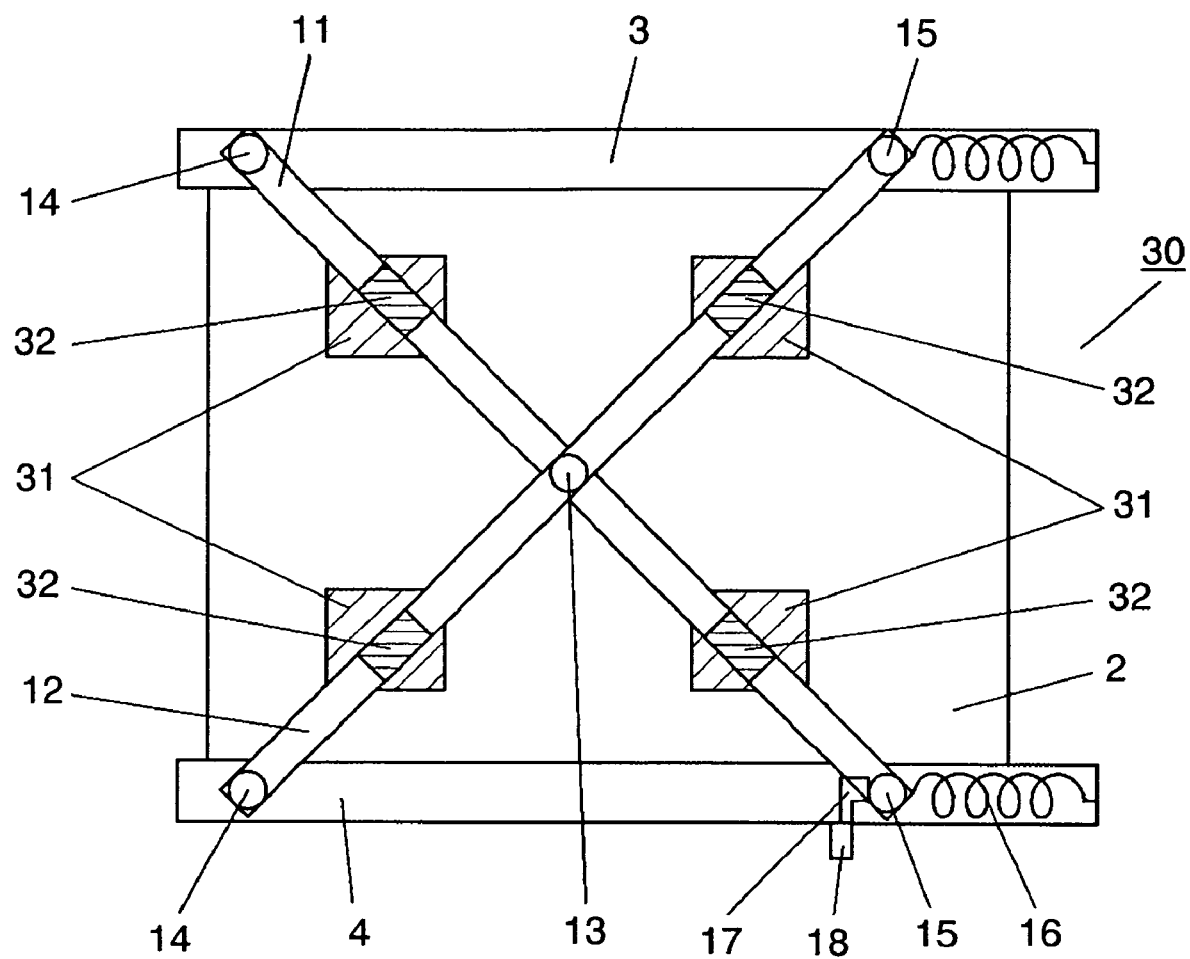
FIG. 9 is a rear view showing a structure of a display device of a third second embodiment of the present invention.

FIG. 9 is a rear view showing a structure of display device 30 of a third embodiment of the present invention. FIG. 9 shows a state in which roll-up sheet-like display part 2 using an organic EL element is rolled out from cylindrical take-up part 3. Display part 2 is provided on its rear surface with sheet-like first magnets 31, which can be rolled up together with display part 2. The rear surface is further provided with a set of linkage consisting of first rail 11 and second rail 12, which is pasted with second magnets 32 corresponding in position to first magnets 31. When display part 2 is rolled out from take-up part 3 completely as shown in FIG. 9, first magnets 31 and second magnets 32 are coupled magnetically.

To roll up display part 2 inside take-up part 3 for storage, the user can release the coupling between first magnets 31 and second magnets 32 and then operate switch 18 to disengage stopper 17. As a result, the restoring force of springs 16 causes second rail supports 15 to slide toward one end of take-up part 3 and pulling part 4. This allows the set of linkage consisting of first and second rails 11 and 12 to be folded in such a manner as to be stretched in right and left directions from rail intersection 13, thereby rolling up display part 2 inside take-up part 3 for storage. The other components and operations are identical to those described in the second embodiment, and hence the description thereof will be omitted.

Thus housing display part 2 completely in take-up part 3 allows a large-screen image display device to be stored compactly and to be ultraportable. It also prevents display part 2, which is not exposed, from getting dirty or being discolored.

When display part 2 is in a spread state, its rear surface is fixed by first and second rails 11 and 12. This structure reduces the swaying of display part 2 caused by the wind from an air conditioner or natural wind or by the vibration of the acoustic device such as a speaker. The structure is particularly resistant to the wind coming from behind display part 2. As a result, the user can easily set up display device 30 without regard to wind. As in the embodiment, the display device can be prevented from being damaged by the swaying of its own.

In the third embodiment, display part 2 is combined with first and second rails 11 and 12 by using first magnets 31 as a first joint part and second magnets 32 as a second joint part. However, it is alternatively possible that either the first joint part or the second joint part is made of magnet, and the other is made of ferromagnet to achieve the same advantage. It is also possible that either one of the two joint parts is made of electromagnet. In these cases, controlling the magnetic force makes it possible to arbitrarily adjust the strength to combine display part 2 with first and second rails 11 and 12 or the ease of separating them.

Combining display part 2 with first and second rails 11 and 12 may be achieved by using a component other than a magnet, such as a hook and locking piece, a surface fastener, or a snap button.

Springs 16, stopper 17, and switch 18 used in the third embodiment are not essential components of the present invention, as in the second embodiment.

The linkage provided on the rear surface of display part 2 may be designed to be detachable from take-up part 3 and pulling part 4 via first and second rail supports 14 and 15. The linkage consisting of two or more pairs of rails may be provided. One end of first rail 11 and one end of second rail 12 of the linkage may be rotatably supported by first rail supports 14 on take-up part 3 and pulling part 4, respectively, and first rails 11 and second rails 12 are connected to each other at their ends in such a manner as to be rotatably supported by rail intersections 13. Display part 2 may be provided with fixing rails 20 to fix its both ends when it is spread out. First and second rails 11 and 12 may be designed to be extendable in accordance with the spread of display part 2. These possible structures are identical to those in the second embodiment.

Take-up part 3 in the third embodiment rolls up display part 2 inside for storage. However, as in the second embodiment, take-up part 3 may be structured in any other way as long as it rolls up display part 2 around its axis.

In the case of rolling up display part 2 inside take-up part 3 for storage, the take-up port of take-up part 3 may be provided with dust brush or with a rubber lid having a slit in the center as in the first embodiment.

Take-up part 3 and pulling part 4 are cylindrical in the third embodiment; however, they can have other shapes as long as they fulfill their functions. For example, take-up part 3 may be a rectangular column, or pulling part 4 may be formed only at the bottom center of display part 2.

Pulling part 4 may be rolled up, together with display part 2, inside take-up part 3 for storage. Switch 18 may be fixed at an arbitrary position on take-up part 3 or pulling part 4.

Display device 30 in the third embodiment is an organic EL display using an organic EL element as display part 2, but is not limited to an organic EL element as in the second embodiment.

Fourth Exemplary Embodiment

Figure 10:
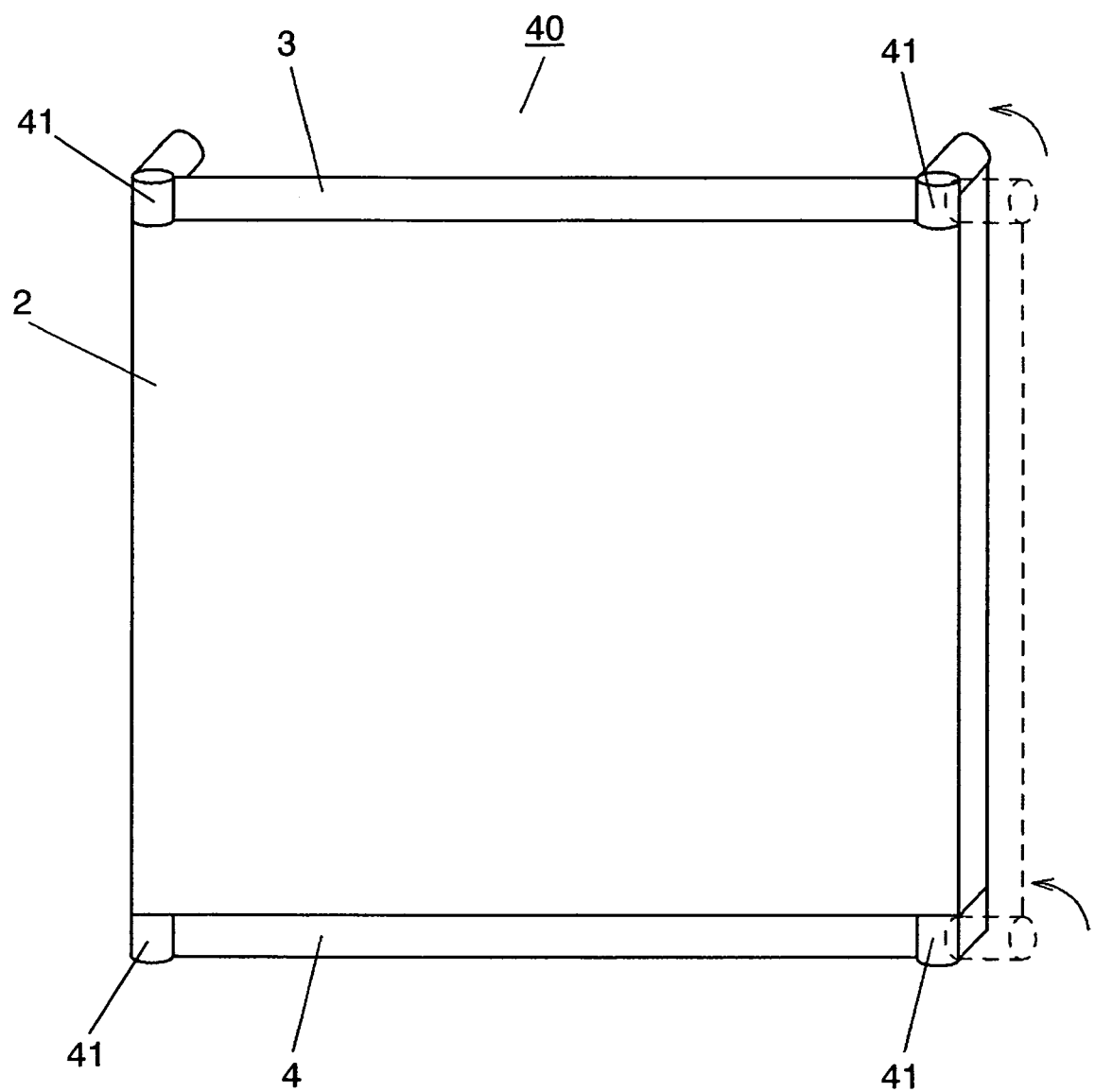
FIG. 10 is a front view showing a structure of a display device of a fourth embodiment of the present invention.

FIG. 10 is a front view showing a structure of display device 40 of a fourth embodiment of the present invention. FIG. 10 shows a state in which roll-up sheet-like display part 2 using an organic EL element is rolled out from cylindrical take-up part 3. In the fourth embodiment, display part 2 is rolled up around the outer surface of take-up part 3 for storage. The user of display device 40 pulls pulling part 4 downward to roll display part 2 out from take-up part 3. When display part 2 is spread to a desired size, bending parts 41, which are provided at both ends of each of take-up part 3 and pulling part 4 are bent backward. This makes both ends of display part 2 that are attached to take-up part 3 also bent backward along bending parts 41.

By thus designing display part 2 bendable at both ends, display device 40 can have display part 2 that has a roll-up, compact storage structure and is nevertheless resistant to the wind or vibration when spread out. This provides the user with more choices in selecting a site to place display device 40. As in the second embodiment, the display device can be prevented from being damaged by the swaying of its own.

Bending parts 41 are provided at both ends of each of take-up part 3 and pulling part 4 in the fourth embodiment. However, it is alternatively possible that only a single bending part 41 is provided at one end of take-up part 3 or at one end of pulling part 4. In this case, the area of display part 2 that is bent backward by bending part 41 does not need to be an organic EL display because the area is not seen from the front of display device 40 when images are displayed.

In display device 40 of the fourth embodiment, display part 2 may be provided on its rear surface with a set of linkage consisting of first and second rails 11 and 12, springs 16, stopper 17, switch 18, and stopper 19 as in the second embodiment. Display device 40 may be further provided with first magnets 21 and second magnets 22 as in the third embodiment.

The linkage provided on the rear surface of display part 2 may be designed to be detachable from take-up part 3 and pulling part 4 via first and second rail supports 14 and 15. The linkage consisting of two or more pairs of rails may be provided. One end of first rail 11 and one end of second rail 12 of the linkage may be rotatably supported by first rail supports 14 on take-up part 3 and pulling part 4, respectively, and first rails 11 and second rails 12 are connected to each other at their ends in such a manner as to be rotatably supported by rail intersections 13. Display part 2 may be provided with fixing rails 20 to fix its both ends when it is spread out. First and second rails 11 and 12 may be designed to be extendable in accordance with the spread of the display part. These possible structures are identical to those in the second embodiment.

Either first magnets 31 or second magnets 32 can be replaced by ferromagnet. Alternatively, either first magnets 31 or second magnets 32 can be electromagnets or other non-magnetic components as in the third embodiment.

Take-up part 3 in the fourth embodiment rolls up display part 2 around its outer surface. However, take-up part 3 may be structured in any other way and can roll up display part 2 around its inner axis.

In the case of rolling up display part 2 inside take-up part 3 for storage, the take-up port of take-up part 3 may be provided with dust brush or with a rubber lid having a slit in the center as in the first embodiment.

Take-up part 3 and pulling part 4 are cylindrical in the fourth embodiment; however, they can have other shapes as long as they fulfill their functions. For example, take-up part 3 may be a rectangular column, or pulling part 4 may be formed only at the bottom center of display part 2.

Bending part 41 may have any structure as long as it can bend an end of take-up part 3 or pulling part 4 like an arm.

Pulling part 4 may be rolled up, together with display part 2, inside take-up part 3 for storage. Switch 18 may be fixed at an arbitrary position on take-up part 3 or pulling part 4.

Display device 40 in the fourth embodiment is an organic EL display using an organic EL element as display part 2, but is not limited to an organic EL display.

Fifth Exemplary Embodiment

Figure 11:
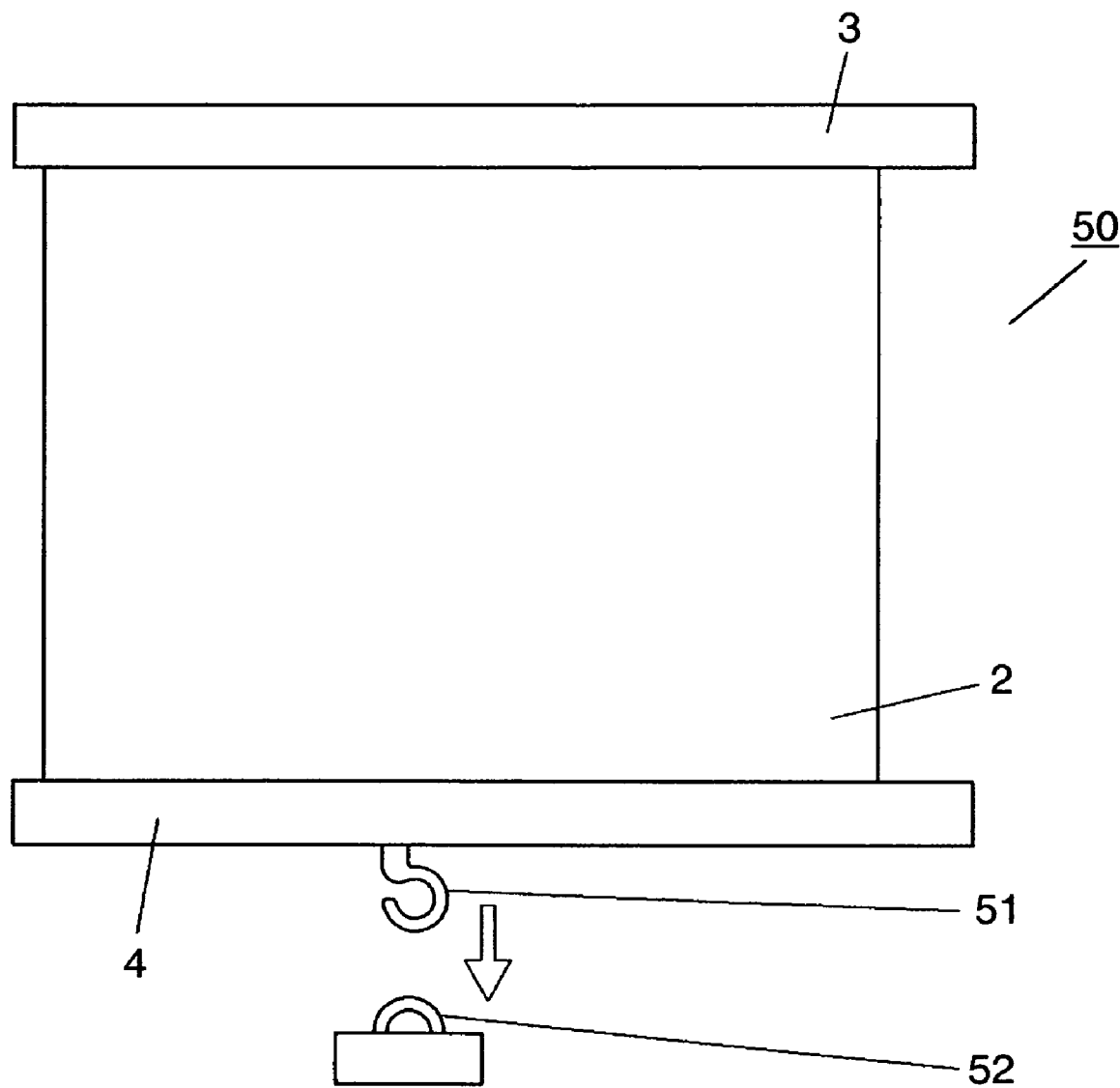
FIG. 11 is a front view showing a structure of a display device of a fifth embodiment of the present invention.

FIG. 11 is a view showing a structure of display device 50 of a fifth embodiment of the present invention. FIG. 11 shows a state in which roll-up sheet-like display part 2 using an organic EL element is rolled out from cylindrical take-up part 3. In FIG. 11, when display part 2 is rolled out from take-up part 3 and spread to a desired size, the user engages hook 51 fixed to pulling part 4 with locking piece 52 fixed to an external stationary object so as to keep display part 2 in a spread state.

By thus designing pulling part 4 to be fixed using hook 51 and locking piece 52, display device 50 can have display part 2 that has a roll-up, compact storage structure and is nevertheless resistant to the wind or vibration when it is spread out. This provides the user with more choices in selecting a site to place display device 50. As in the second embodiment, the display device can be prevented from being damaged by the swaying of its own.

In this case, pulling part 4 may have a plurality of hooks 51 and locking pieces 52. The provision of a plurality of hooks 51 and locking pieces 52 further enhances the effect of reducing the influence of wind or the like.

Display part 2 and pulling part 4 are fixed to an external stationary object by using hook 51 and locking piece 52 in the fifth embodiment, but alternatively can be fixed by using a magnet, an electromagnet, a surface fastener, or a snap button. Hook 51 and locking piece 52 are not particularly limited in shape, and may have any shape as long as they can be fixed to the external stationary object.

In display device 50 of the fifth embodiment, display part 2 may be provided on its rear surface with a set of linkage consisting of first and second rails 11 and 12, springs 16, stopper 17, switch 18, and stopper 19 as in the second embodiment. Display device 50 may be further provided with first magnets 31 and second magnets 32 as in the third embodiment.

The linkage provided on the rear surface of display part 2 may be designed to be detachable from take-up part 3 and pulling part 4 via first and second rail supports 14 and 15. The linkage consisting of two or more pairs of rails may be provided. One end of first rail 11 and one end of second rail 12 of the linkage may be rotatably supported by first rail supports 14 on take-up part 3 and pulling part 4, respectively, and first rails 11 and second rails 12 are connected to each other at their ends in such a manner as to be rotatably supported by rail intersections 13. Display part 2 may be provided with fixing rails 20 to fix its both ends when it is spread out. First and second rails 11 and 12 may be designed to be extendable in accordance with the spread of the display part. These possible structures are identical to those in the second embodiment.

Either first magnets 31 or second magnets 32 can be replaced by ferromagnet. Alternatively, either first magnets 31 or second magnets 32 can be electromagnets or other non-magnetic components as in the third embodiment.

Take-up part 3 and pulling part 4 may be provided at both ends with bending parts 41. It is alternatively possible that only a single bending part 41 is provided at one end of take-up part 3 or at one end of pulling part 4 as in the fourth embodiment.

Take-up part 3 in the fifth embodiment rolls up display part 2 inside for storage. However, as in the second embodiment, take-up part 3 may be structured in any other way as long as it rolls up display part 2 around its axis.

In the case of rolling up display part 2 inside take-up part 3 for storage, the take-up port of take-up part 3 may be provided with dust brush or with a rubber lid having a slit in the center as in the first embodiment.

Take-up part 3 and pulling part 4 are cylindrical in the fifth embodiment; however, they can have other shapes as long as they fulfill their functions. For example, take-up part 3 may be a rectangular column, or pulling part 4 may be formed only at the bottom center of display part 2.

Pulling part 4 may be rolled up, together with display part 2, inside take-up part 3 for storage. Switch 18 may be fixed at an arbitrary position on take-up part 3 or pulling part 4.

Display device 50 in the fifth embodiment is an organic EL display using an organic EL element as display part 2, but is not limited to an organic EL display.

Sixth Exemplary Embodiment

Figure 12:
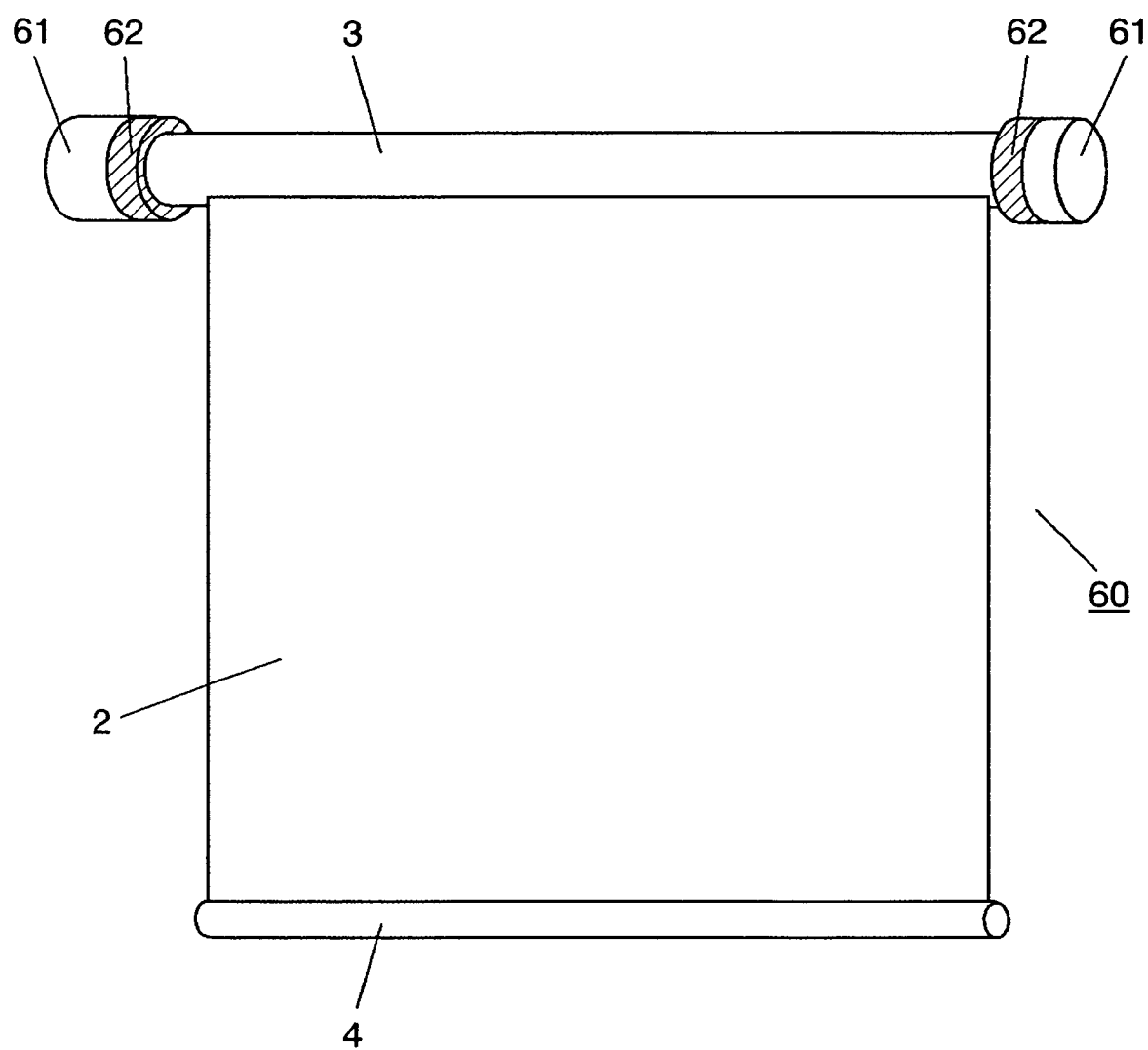
FIG. 12 is a view showing a structure of a display device of a seventh embodiment of the present invention.

FIG. 12 is a view showing a structure of display device 60 of a sixth embodiment of the present invention. FIG. 12 shows a state in which roll-up sheet-like display part 2 using an organic EL element is rolled out from cylindrical take-up part 3. Take-up part 3 is provided at both ends with speakers 61 with vibration-proof rubbers 62 disposed between take-up part 3 and speakers 61.

By thus providing vibration-proof rubbers 62 to reduce the vibration of speakers 61, display device 60 can have display part 2 that has a roll-up, compact storage structure and is nevertheless resistant to the vibration from speakers 61 when it is spread out.

The vibration from speakers 61 is reduced by providing vibration-proof rubbers 62 in the present embodiment; however it is alternatively possible to use other vibration-proof materials such as springs, air springs, or insulators.

Speakers 61 and vibration-proof parts 62 are provided at both ends of take-up part 3 in the present embodiment; however, they can alternatively be provided at one end or the center of take-up part 3, or on pulling part 4.

In display device 60 of the sixth embodiment, display part 2 may be provided on its rear surface with a set of linkage consisting of first and second rails 11 and 12, springs 16, stopper 17, switch 18, and stopper 19 as in the second embodiment. Display device 60 may be further provided with first magnets 31 and second magnets 32 as in the third embodiment.

The linkage provided on the rear surface of display part 2 may be designed to be detachable from take-up part 3 and pulling part 4 via first and second rail supports 14 and 15. Linkages consisting of two or more pairs of rails may be provided. One end of first rail 11 and one end of second rail 12 of the linkage may be rotatably supported by first rail supports 14 on take-up part 3 and pulling part 4, respectively, and first rails 11 and second rails 12 are connected to each other at their ends in such a manner as to be rotatably supported by rail intersections 13. Display part 2 may be provided with fixing rails 20 to fix its both ends when it is spread out. First and second rails 11 and 12 may be designed to be extendable in accordance with the spread of the display part. These possible structures are identical to those in the second embodiment.

Either first magnets 31 or second magnets 32 can be replaced by ferromagnet. Alternatively, either first magnets 31 or second magnets 32 can be electromagnets or other non-magnetic components as in the third embodiment.

Take-up part 3 and pulling part 4 may be provided at both ends with bending parts 41. It is alternatively possible that only a single bending part 41 is provided at one end of take-up part 3 or at one end of pulling part 4 as in the fourth embodiment.

Pulling part 4 may be provided with hook 51, which is engaged with locking piece 52 fixed to an external stationary object. Hook 51 and locking piece 52 are not particularly limited in shape as in the fifth embodiment.

Take-up part 3 in the sixth embodiment rolls up display part 2 inside for storage. However, as in the second embodiment, take-up part 3 may be structured in any other way as long as it rolls up display part 2 around its axis.

In the case of rolling up display part 2 inside take-up part 3 for storage, the take-up port of take-up part 3 may be provided with dust brush or with a rubber lid having a slit in the center as in the first embodiment.

Take-up part 3 and pulling part 4 are cylindrical in the sixth embodiment; however, they can have other shapes as long as they fulfill their functions. For example, take-up part 3 may be a rectangular column, or pulling part 4 may be formed only at the bottom center of display part 2.

Pulling part 4 may be rolled up, together with display part 2, inside take-up part 3 for storage. Switch 18 may be fixed at an arbitrary position on take-up part 3 or pulling part 4.

Display device 60 in the sixth embodiment is an organic EL display using an organic EL element as display part 2, but is not limited to an organic EL display.

Seventh Exemplary Embodiment

Figure 13:
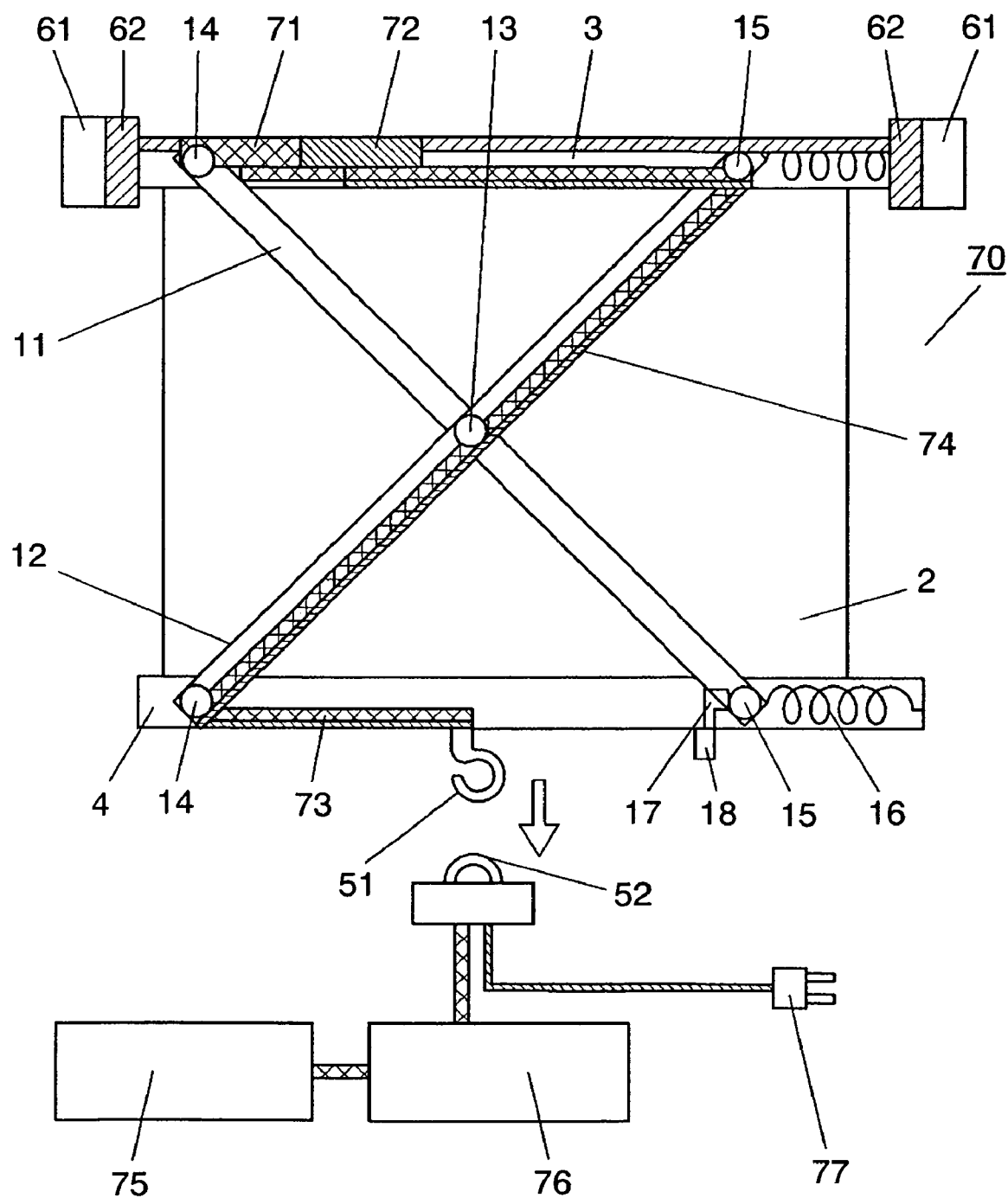
FIG. 13 is a view showing a structure of a display device of a sixth embodiment of the present invention.

FIG. 13 is a view showing a structure of display device 70 of a seventh embodiment of the present invention. FIG. 13 shows a state in which roll-up sheet-like display part 2 using an organic EL element is rolled out from cylindrical take-up part 3. In FIG. 13, take-up part 3 includes audiovisual circuit 71 and power circuit 72. Audiovisual circuit 71 provides display part 2 with visual information and also provides speakers 61 with audio information. Power circuit 72 provides display part 2 with power necessary for the display of images. The user pulls down display part 2 and engages hook 51 with locking piece 52 to fix display part 2. Take-up part 3, cylindrical pulling part 4, and second rail 12, which is one of the rails composing the linkage on the rear surface of display part 2, include audiovisual wiring 73 and power wiring 74. Audiovisual wiring 73 transmits audiovisual information to audiovisual circuit 71, and power wiring 74 transmits power to power circuit 72. Hook 51 and locking piece 52 are connecting terminals for the audiovisual information and the power supply. Engaging hook 51 with locking piece 52 can establish connection between display device 70 and audiovisual information reproducing means 75 such as an external DVD player or a digital-analog broadcast receiver, AV amplifier 76, and AC outlet 77. The other components and operations in the seventh embodiment are identical to those described in the second and sixth embodiments, and hence the description thereof will be omitted.

The audiovisual information from audiovisual information reproducing means 75 is transmitted to audiovisual circuit 71 via AV amplifier 76, locking piece 52, hook 51, and audiovisual wiring 73. Similarly, the AC power supply from AC outlet 77 is transmitted to power circuit 72 via locking piece 52, hook 51, and power wiring 74.

The wirings for providing the audiovisual information and the power to audiovisual circuit 71 and power circuit 72, respectively, are housed inside the linkage so as to be protected against outside influences and also not to be bulky when display device 70 is taken away. Using hook 51 and locking piece 52 as the connecting terminals can eliminate the need for providing separate connecting terminals, thereby making it unnecessary to bring a connection cable when the user carries display device 70. This makes it easier to set up display device 70 because display part 2 has a roll-up, compact storage structure and is nevertheless easily connected to an external device when it is spread out.

Audiovisual circuit 71 and power circuit 72 are stored inside take-up part 3, and the wirings are stored inside take-up part 3, pulling part 4, and second rail 12 in the present embodiment. However, the present invention is not limited to this example. Audiovisual circuit 71 and power circuit 72 can alternatively be inside pulling part 4. It is also possible that one of audiovisual circuit 71 and power circuit 72 is inside take-up part 3, and the other is inside pulling part 4. The wirings may also be stored inside first rail 11, or inside at least one of take-up part 3, pulling part 4, first rail 11, and second rail 12. Audiovisual wiring 73 and power wiring 74 may be provided along the outer surface of take-up part 3, pulling part 4, first rail 11, and second rail 12.

The connecting terminals used in the seventh embodiment are hook 51 and locking piece 52; however, other types of connecting terminals may be provided on at least one of take-up part 3, pulling part 4, first rail 11, and second rail 12.

It is also possible to provide a magnetic shield for avoiding magnetic influence or an electromagnetic shield for avoiding electromagnetic influence to either a part or the whole of the outer surface of take-up part 3, pulling part 4, first rail 11, and second rail 12. This can prevent images on display part 2 from being distorted by the influence of magnetism or electromagnetism caused by the wirings when the wirings are stored inside take-up part 3, pulling part 4, first rail 11, and second rail 12.

The magnetic shield and the electromagnetic shield may be provided on either a part or the whole of the rear surface of display part 2. This can prevent display part 2 from being influenced by the magnetism or electromagnetism caused by the wirings when the wirings are stored inside take-up part 3, pulling part 4, first rail 11, and second rail 12. When the rear surface of display part 2 is provided with a magnetic shield and an electromagnetic shield, the influence of magnetism and electromagnetism from another AV device placed near display device 70 can be avoided.

First rail 11, second rail 12, spring 16, stopper 17, switch 18, speakers 61, and vibration-proof rubbers 62 used in the seventh embodiment are not essential components of the present invention, and the advantages of the present invention could be obtained without them.

Display device 70 of the seventh embodiment may be further provided with first magnets 21 and second magnets 22 as in the third embodiment.

The linkage provided on the rear surface of display part 2 may be designed to be detachable from take-up part 3 and pulling part 4 via first and second rail supports 14 and 15. Linkages consisting of two or more pairs of rails may be provided. One end of first rail 11 and one end of second rail 12 of the linkage may be rotatably supported by first rail supports 14 on take-up part 3 and pulling part 4, respectively, and first rails 11 and second rails 12 are connected to each other at their ends in such a manner as to be rotatably supported by rail intersections 13. Display part 2 may be provided with fixing rails 20 to fix its both ends when it is spread out. First and second rails 11 and 12 may be designed to be extendable in accordance with the spread of the display part. These possible structures are identical to those in the second embodiment.

Either first magnets 21 or second magnets 22 can be replaced by ferromagnet. Alternatively, either first magnets 21 or second magnets 22 can be electromagnets or other non-magnetic components as in the third embodiment.

Take-up part 3 and pulling part 4 may be provided at both ends with bending parts 41. It is alternatively possible that only a single bending part 41 is provided at one end of take-up part 3 or at one end of pulling part 4 as in the fourth embodiment.

Pulling part 4 may be provided with hook 51, which is engaged with locking piece 52 fixed to an external stationary object. Hook 51 and locking piece 52 are not particularly limited in shape as in the fifth embodiment.

Take-up part 3 in the seventh embodiment rolls up display part 2 inside for storage. However, as in the second embodiment, take-up part 3 may be structured in any other way as long as it rolls up display part 2 around its axis.

In the case of rolling up display part 2 inside take-up part 3 for storage, the take-up port of take-up part 3 may be provided with dust brush or with a rubber lid having a slit in the center as in the first embodiment.

Take-up part 3 and pulling part 4 are cylindrical in the seventh embodiment; however, they can have other shapes as long as they fulfill their functions. For example, take-up part 3 may be a rectangular column, or pulling part 4 may be formed only at the bottom center of display part 2.

Pulling part 4 may be rolled up, together with display part 2, inside take-up part 3 for storage. Switch 18 may be fixed at an arbitrary position on take-up part 3 or pulling part 4.

Display device 70 in the seventh embodiment is an organic EL display using an organic EL element as display part 2, but is not limited to an organic EL display.

Eighth Exemplary Embodiment

Figure 14:
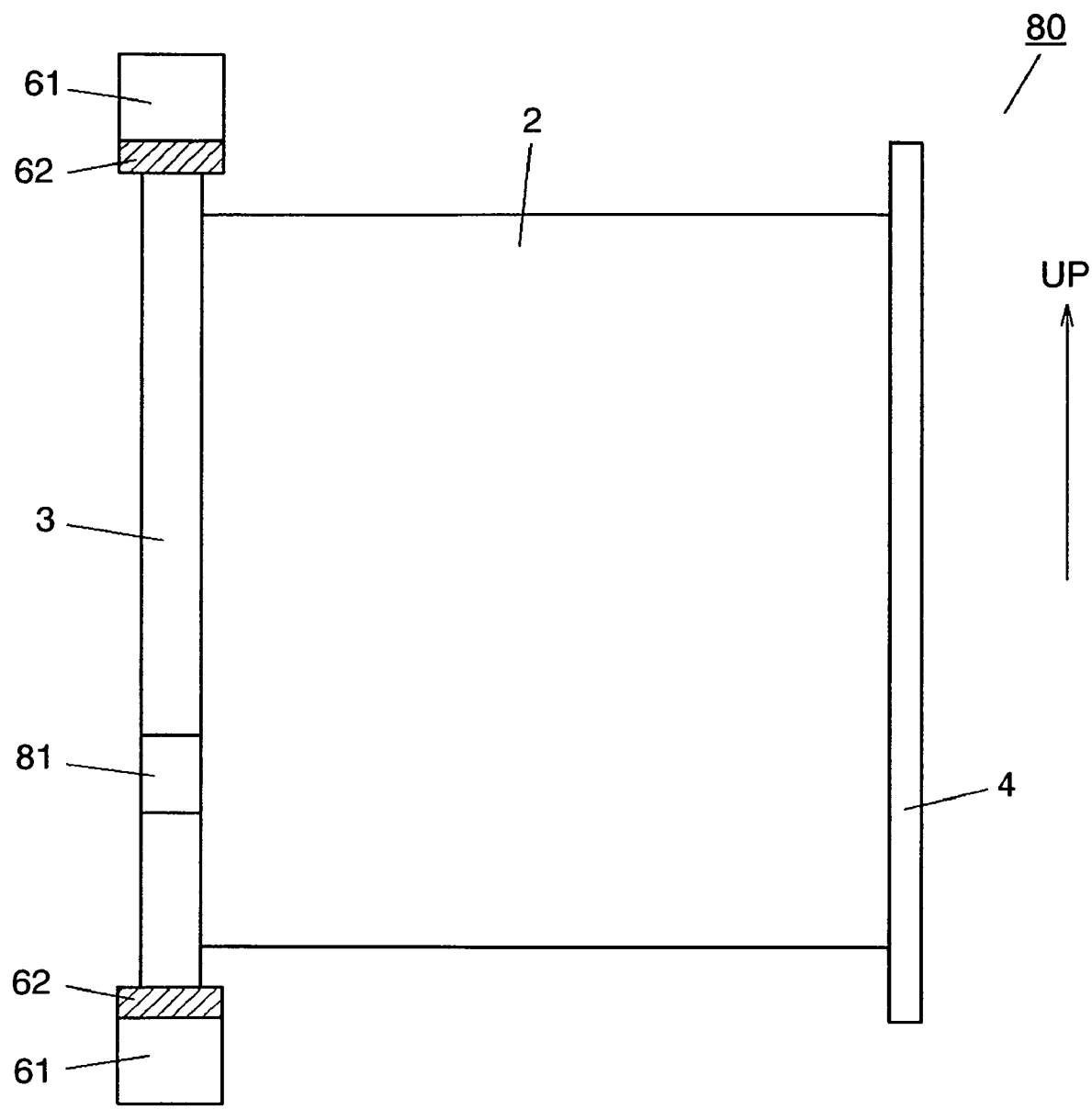
FIG. 14 is an external view showing a display device of an eighth embodiment of the present invention.
Figure 15:
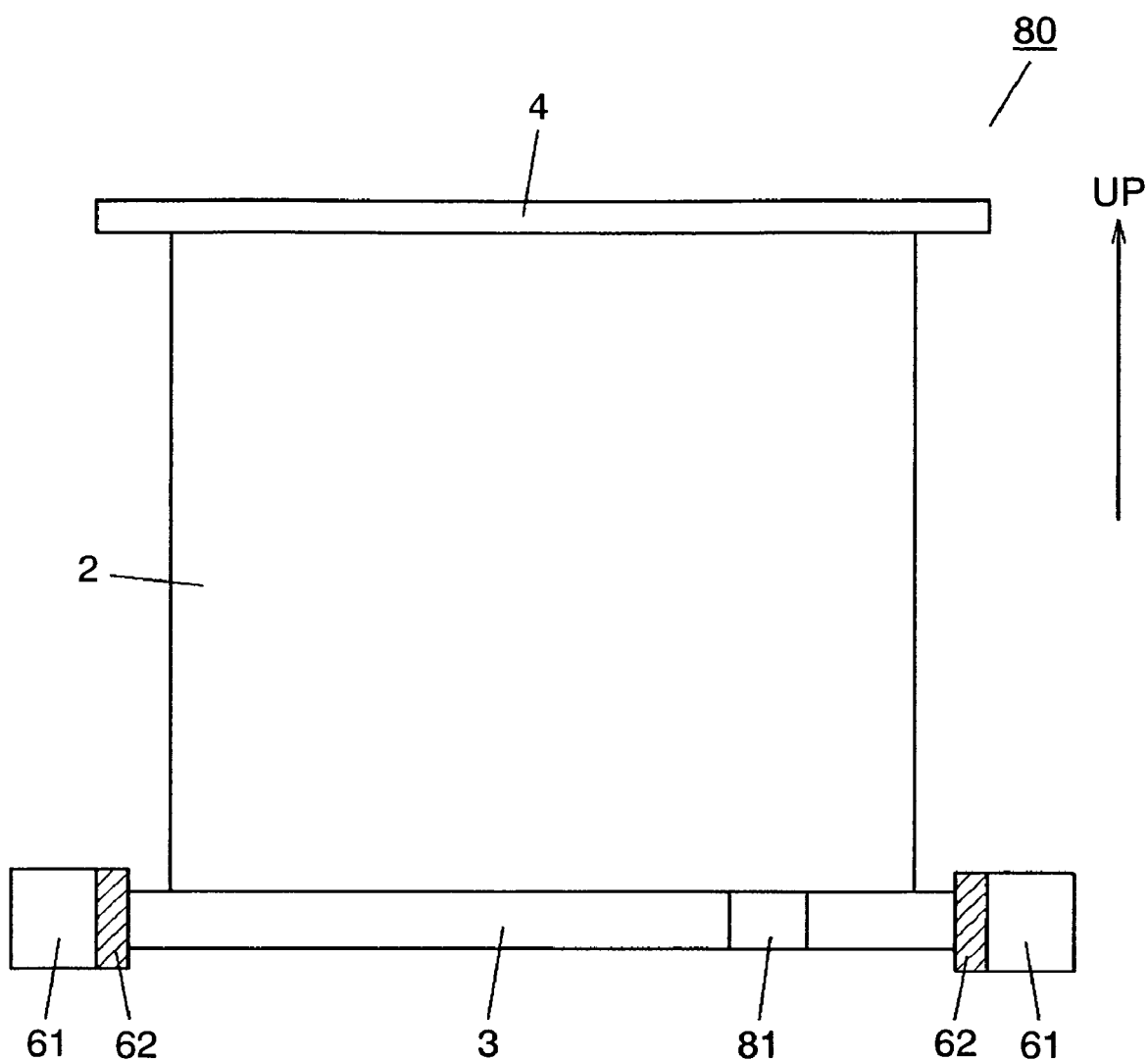
FIG. 15 is an external view showing the display device of the eighth embodiment of the present invention.
Figure 16:
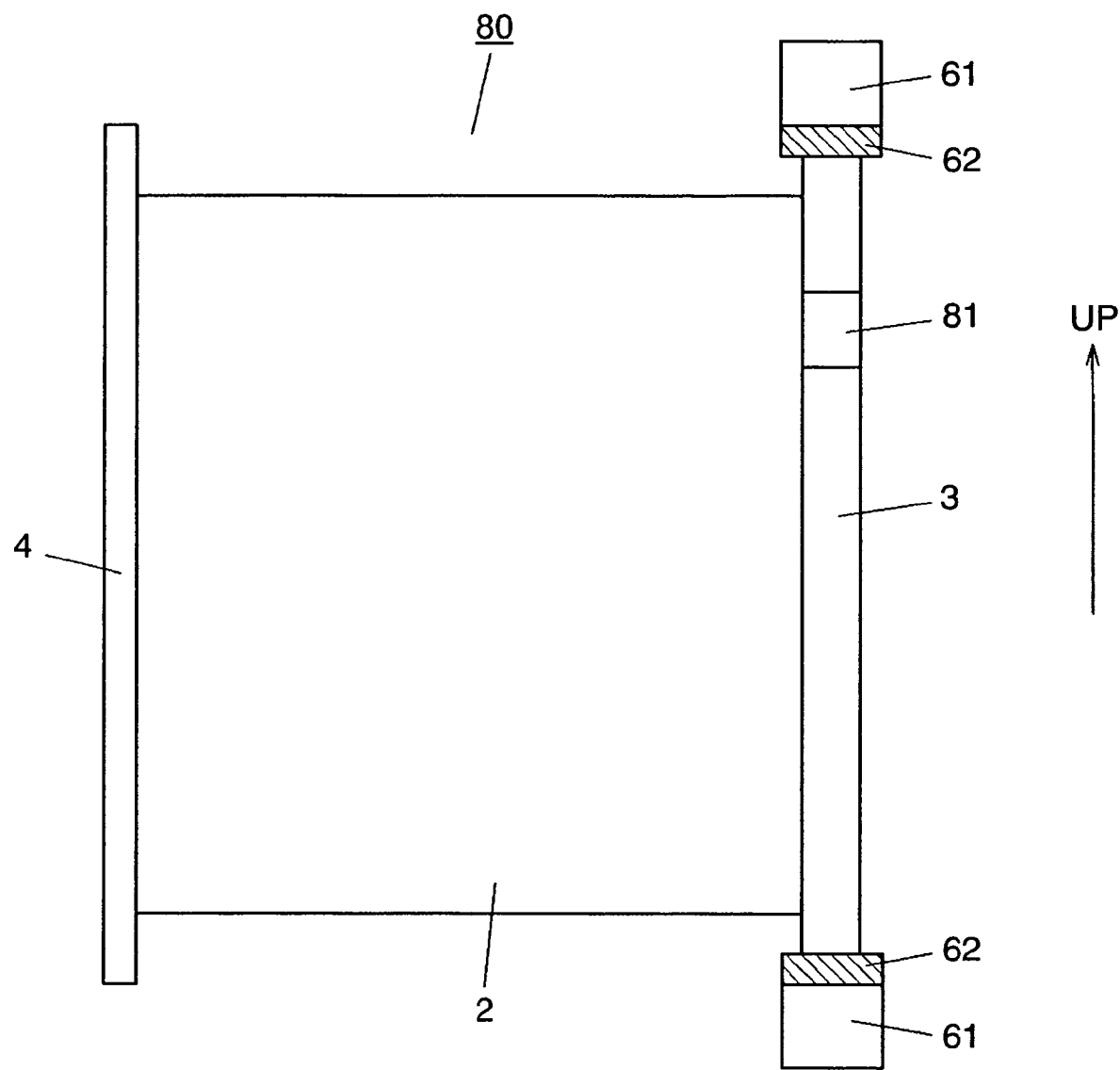
FIG. 16 is an external view showing the display device of the eighth embodiment of the present invention.

FIGS. 14 to 16 are external views showing display device 80 of an eighth embodiment of the present invention.

FIGS. 14 to 16 show states in which roll-up sheet-like display part 2 using an organic EL element is rolled out from take-up part 3. Take-up part 3 is provided at both ends with speakers 61 and vibration-proof rubbers 62. Take-up part 3 is further provided with image control device 81, which detects the top, bottom, left, and right sides of take-up part 3 so as to control the top, bottom, left, and right sides of images on display part 2.

The provision of image control device 81 enables images on display part 2 to be always in the normal direction regardless of which side of display device 80 is down. This structure provides the user with a display device that can be stored compactly, ultraportable, and easy to set up.

Figure 17:
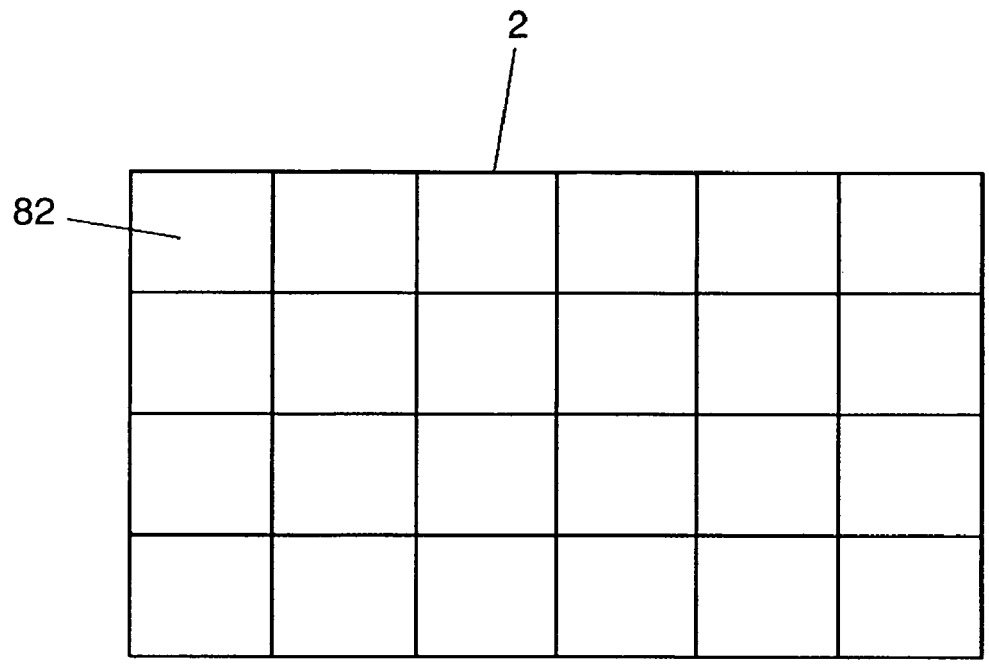
FIG. 17 is a schematic diagram showing a display part of the display device of the eighth embodiment of the present invention.

As shown in FIG. 17, display part 2 consists of a plurality of small array elements 82 like an LCD or a PDP, and images can be displayed on the screen by providing image signals as digital signals to array elements 82. Therefore, changing the order of digital image signals to be provided to array element 82 could change the directions of the sides of the screen. Note that FIG. 17 is a schematic diagram showing the structure of display part 2, and the number of array elements 82 is not limited to the number shown in FIG. 17.

Figure 18:
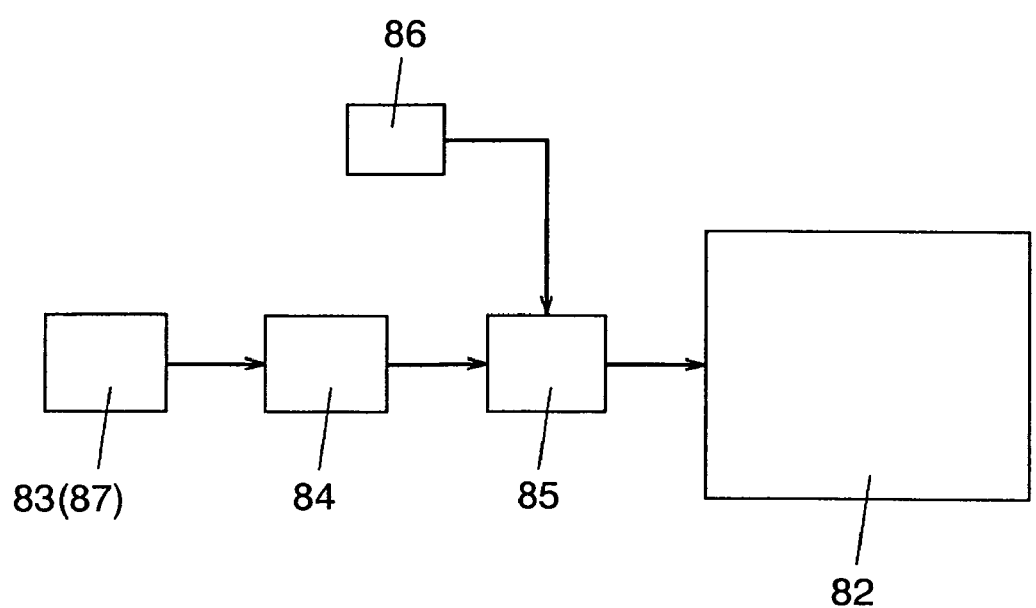
FIG. 18 is a block diagram showing a circuit structure of an image control device in the eighth embodiment of the present invention.

FIG. 18 is a block diagram showing a circuit structure of image control device 81. In FIG. 18, side detection part 83 detects the top, bottom, left, and right sides of display device 80, and transmits the information to direction controller 84. Direction controller 84 determines the direction in which to display images based on the information about the top, bottom, left, and right sides transmitted from side detection part 83, and transmits information about directional instructions to image display control part 85. Image display control part 85 transmits visual information received from tuner 86 to array elements 82 of display part 2 in accordance with the information about directional instructions received from direction controller 84. This enables a plurality of array elements 82 of display part 2 to display the images always corresponding to the direction for the user to see the images.

Side detection part 83 can be a gravity sensor, a pressure sensor or the like.

Side detection part 83 automatically detects the top, bottom, left, and right sides of display device 80, and image display control part 85 controls the top, bottom, left, and right sides of images displayed on display part 2 based on the detected results in the eighth embodiment. Another preferred structure is that the user determines the sides as desired. In this case, in place of side detection part 83, side input part 87 receives the user's instruction about the top, bottom, left, and right sides and then transmits the information to direction controller 84. Side input part 87 can be, for example, a remote controller provided outside display device 80.

Display device 80 includes speakers 61 and vibration-proof parts 62 in the eighth embodiment; however, these components are not essential.

In display device 80 of the eighth embodiment, display part 2 may be provided on its rear surface with a set of linkage consisting of first and second rails 11 and 12, springs 16, stopper 17, switch 18, and stopper 19 as in the second embodiment. Display device 80 may be further provided with first magnets 31 and second magnets 32 as in the third embodiment.

The linkage provided on the rear surface of display part 2 may be designed to be detachable from take-up part 3 and pulling part 4 via first and second rail supports 14 and 15. The linkage consisting of two or more pairs of rails may be provided. One end of first rail 11 and one end of second rail 12 of the linkage may be rotatably supported by first rail supports 14 on take-up part 3 and pulling part 4, respectively, and first rails 11 and second rails 12 are connected to each other at their ends in such a manner as to be rotatably supported by rail intersections 13. Display part 2 may be provided with fixing rails 20 to fix its both ends when it is spread out. First and second rails 11 and 12 may be designed to be extendable in accordance with the spread of the display part. These possible structures are identical to those in the second embodiment.

Either first magnets 31 or second magnets 32 can be replaced by ferromagnet. Alternatively, either first magnets 31 or second magnets 32 can be electromagnets or other non-magnetic components as in the third embodiment.

Take-up part 3 and pulling part 4 may be provided at both ends with bending parts 41. It is alternatively possible that only a single bending part 41 is provided at one end of take-up part 3 or at one end of pulling part 4 as in the fourth embodiment.

Pulling part 4 may be provided with hook 51, which is engaged with locking piece 52 fixed to an external stationary object. Hook 51 and locking piece 52 are not particularly limited in shape as in the fifth embodiment.

Furthermore, take-up part 3, pulling part 4, first rail 11, second rail 12, and hook 51 may be provided with audiovisual circuit 71, power circuit 72, audiovisual wiring 73, and power wiring 74. It is also possible to provide a magnetic shield for avoiding magnetic influence and an electromagnetic shield for avoiding electromagnetic influence to either a part or the whole of the rear surface of display part 2, and to either a part or the whole of the outer surface of take-up part 3, pulling part 4, first rail 11, and second rail 12. The other structures in the eighth embodiment are identical to those in the seventh embodiment.

Take-up part 3 in the eighth embodiment rolls up display part 2 inside for storage. However, as in the second embodiment, take-up part 3 may be structured in any other way as long as it rolls up display part 2 around its axis.

In the case of rolling up display part 2 inside take-up part 3 for storage, the take-up port of take-up part 3 may be provided with dust brush or with a rubber lid having a slit in the center as in the first embodiment.

Take-up part 3 and pulling part 4 are cylindrical in the eighth embodiment; however, they can have other shapes as long as they fulfill their functions. For example, take-up part 3 may be a rectangular column, or pulling part 4 may be formed only at the bottom center of display part 2.

Pulling part 4 may be rolled up, together with display part 2, inside take-up part 3 for storage. Switch 18 may be fixed at an arbitrary position on take-up part 3 or pulling part 4.

Display device 80 in the eighth embodiment is an organic EL display using an organic EL element as display part 2, but is not limited to an organic EL display.

INDUSTRIAL APPLICABILITY

The display device of the present invention allows a sheet-like display device using a direct-view display element such as an organic EL element to be stored compactly to improve portability. Furthermore, the display device can reduce vibration due to wind and other factors, and also be easily set up with any side down by preventing screen deflection when the display device is set up. The display device is thus useful in the field of display devices.

The invention claimed is:

1. A display device comprising:
    a display part made of a roll-up direct-view display element;
    a take-up part attached on one end of the display part, the take-up part allowing the display part to be rolled up;
    a pulling part attached on an other end of the display part, the pulling part allowing the display part to be rolled out; and
    a holding part for holding the display part from behind, wherein
    the holding part is formed of linkage, which are stored on a rear surface of the display part when the display part is rolled up, and are stretched across the rear surface of the display part when the display part is rolled out; and
    the linkage includes:
        a first rail having a first end and a second rail having a second end, the first rail and the second rail crossing each other
        a rail intersection for rotatably supporting the first rail and the second rail at a point where the first rail and the second rail cross each other,
        the first end being slidable within the pulling part and the second end being slidable within the take-up part;
    the display part includes a first joint part on the rear surface thereof;
    the holding part includes a second joint part;
    the first joint part and the second joint part face each other when the display part is spread out,
    at least one of the first joint part and the second joint part is one of a magnet and an electromagnet, and
    the first joint part and the second joint part attract magnetically.

2. The display device of claim 1, wherein:
    the first rail further includes a third end and the second rail further includes a fourth end, and
    the take-up part and the pulling part each comprise:
    a first rail support for rotatably supporting the fourth end and the third end, respectively; and
    a second rail support for rotatably and slidably supporting the first end and the second end, respectively.

3. The display device of claim 2, wherein the take-up part and the pulling part further each include an elastic member, the elastic member biasing the slidable second rail support in a direction away from the first rail support.

4. The display device of claim 1, wherein:
    the first rail further includes a third end and the second rail further includes a fourth end, and the pulling part includes:
  a first rail support for supporting the fourth end rotatably; and
  a second rail support for supporting the first end rotatably and slidably; the take-up part includes:
  a third rail support for supporting the third end rotatably, and
  a fourth rail support for supporting the second end rotatably and slidably.

5. The display device of claim 4, wherein the take-up part and the pulling part further each include an elastic member, the elastic member biasing the slidable second rail support in a direction away from the first rail support.

6. The display device of claim 1, wherein
the take-up part includes a power circuit for supplying power to the display part and an audiovisual circuit for supplying an audiovisual signal to the display part;
the holding part includes a power wiring for supplying the power to the power circuit and an audiovisual wiring for supplying the audiovisual signal to the audiovisual circuit; and
the power supply wiring and the audiovisual wiring are connected to an external power supply and an audiovisual device via a connecting part provided in the pulling part.

7. A display device comprising:
a display part made of a roll-up direct-view display element;
a take-up part attached on one end of the display part, the take-up part allowing the display part to be rolled up;
a pulling part attached on an other end of the display part, the pulling part allowing the display part to be rolled out; and
a holding part for holding the display part from behind, wherein
the holding part is formed of linkage, which are stored on a rear surface of the display part when the display part is rolled up, and are stretched across the rear surface of the display part when the display part is rolled out; and
the linkage includes:
  a first rail having a first end and a second rail having a second end, the first rail and the second rail crossing each other
  a rail intersection for rotatably supporting the first rail and the second rail at a point where the first rail and the second rail cross each other,
  the first end being slidable within the pulling part and the second end being slidable within the take-up part;
  at least one of the take-up part and the pulling part is provided at a side end thereof with a bending part which is bent backward; and
the display part can be bent by bending the bending part.

8. The display device of claim 7, wherein:
the first rail further includes a third end and the second rail further includes a fourth end, and
the take-up part and the pulling part each comprise:
a first rail support for rotatably supporting the fourth end and the third end, respectively; and
a second rail support for rotatably and slidably supporting the first end and the second end, respectively.

9. The display device of claim 8, wherein the take-up part and the pulling part further each include an elastic member, the elastic member biasing the slidable second rail support in a direction away from the first rail support.

10. The display device of claim 7, wherein:
the first rail further includes a third end and the second rail further includes a fourth end, and
the pulling part includes:
  a first rail support for supporting the fourth end rotatably; and
  a second rail support for supporting the first end rotatably and slidably;
the take-up part includes:
  a third rail support for supporting the third end rotatably, and
  a fourth rail support for supporting the second end rotatably and slidably.

11. The display device of claim 10, wherein
the take-up part and the pulling part further each include an elastic member, the elastic member biasing the slidable second rail support in a direction away from the first rail support.

12. The display device of claim 7, wherein
the take-up part includes a power circuit for supplying power to the display part and an audiovisual circuit for supplying an audiovisual signal to the display part;
the holding part includes a power wiring for supplying the power to the power circuit and an audiovisual wiring for supplying the audiovisual signal to the audiovisual circuit; and
the power supply wiring and the audiovisual wiring are connected to an external power supply and an audiovisual device via a connecting part provided in the pulling part.

* * * * *